United States Patent [19]

Shigematsu et al.

[11] Patent Number: 5,595,846
[45] Date of Patent: Jan. 21, 1997

[54] PHTHALOCYANINE MIXED CRYSTAL, PRODUCTION METHOD THEREOF, AND ELECTROPHOTOGRAPHIC PHOTORECEPTOR

[75] Inventors: Yasuyuki Shigematsu, Ushiku; Toyoshi Ohashi, Yokohama; Mariko Hayashi, Inashiki-gun; Shinichi Suzuki, Yokohama, all of Japan

[73] Assignee: Mitsubishi Chemical Corporation, Tokyo, Japan

[21] Appl. No.: 492,493

[22] Filed: Jun. 20, 1995

[30] Foreign Application Priority Data

Jun. 22, 1994 [JP] Japan ..................... 6-140019
Aug. 18, 1994 [JP] Japan ..................... 6-194190
Aug. 18, 1994 [JP] Japan ..................... 6-194191

[51] Int. Cl.$^6$ ............................................. G03G 5/06
[52] U.S. Cl. ............................................. 430/58; 430/78
[58] Field of Search ............................. 430/59, 58, 76, 430/78; 540/140

[56] References Cited

U.S. PATENT DOCUMENTS

| | | |
|---|---|---|
| 4,981,767 | 1/1991 | Tokura et al. . |
| 5,153,313 | 10/1992 | Kazmaier et al. . |
| 5,336,578 | 8/1994 | Nokada ........................ 430/78 |
| 5,354,635 | 10/1994 | Itami et al. ..................... 430/78 |

FOREIGN PATENT DOCUMENTS

| | | |
|---|---|---|
| 0569943 | 11/1993 | European Pat. Off. . |
| 335064 | 2/1995 | Japan . |
| 2145835 | 4/1985 | United Kingdom . |

*Primary Examiner*—John Goodrow
*Attorney, Agent, or Firm*—Oblon, Spivak, McClelland, Maier & Neustadt, P.C.

[57] ABSTRACT

The electrophotgraphic photoreceptor is composed of an electrically conductive substrate having formed thereon a photosensitive layer containing a phthalocyanine mixed crystal comprising titanyl phthalocyanine and hydrogen phthalocyanine, wherein the phthalocyanine mixed crystal has peaks at 6.8°, 7.4°, 15.0°, 24.7°, 26.2°, and 27.2° of the Bragg angle (2 θ±0.2°) in the X-ray diffraction spectrum and having a ratio of the peak intensity at 27.2° to the peak intensity at 6.8° of 1 or more. The electrophotographic photoreceptor can output the output signals as digital signals even when the input light is a digital light or an analog light and thus the electrophotographic photoreceptor can be used for an electrophotograph of a digital recording system and even when the photorecetor is used as a conventional photoreceptor for PPC (analog light input), high-quality images having sharp edges can be obtained.

7 Claims, 9 Drawing Sheets

PHTHALOCYANINE MIXED CRYSTAL, PRODUCTION METHOD THEREOF, AND ELECTROPHOTOGRAPHIC PHOTORECEPTOR

FIELD OF THE INVENTION

The present invention relates to a phthalocyanine mixed crystal, a production method thereof, and an electrophotographic photoreceptor using the phthalocyanine mixed crystal.

BACKGROUND OF THE INVENTION

Electrophotographic processes such as the Carlson process, etc., have been developed with the aim of providing analog depiction depicting of original images. Accordingly, for faithfully reproducing the brightness and darkness of an input light as the brightness and darkness of the corresponding toner images, it has been required that the photoreceptor to be used for this purpose is characterized in that it may pass a photocurrent linearly analogous to the quantity of the input light (the logarithmic value thereof). Therefore, it is essential to select a material having such a characteristic (low $\gamma$ characteristic) as the material for the photoreceptor.

For this purpose, starting from a material resembling a simple photoconductor in the initial stage of an electrophotographic process, a selenium (Se) series amorphous layer, a silicon (Si) series amorphous layer, a zinc oxide (ZnO)-bonded layer prepared for resembling the Se series amorphous layer, etc., have been used as a photosensitive layer. Furthermore, recently, the electrophotographic technology has developed such that a so-called function-separation type photosensitive layer using, in particular, an organic semiconductor is used.

However, recently, printers and facsimile recording systems have been rapidly converted to an electrophotographic recording system by the combination of the electrophotographic technology and a computer technology. Also, even in an ordinary copying machine, it has been desired to make possible image treatments such as a reversal, cutting, transposing, etc.

For this purpose, it has been desired to change the electrophotographic recording system for a conventional analog recording system for PPC to a digital recording system.

Furthermore, as described above, photosensitizers for photoreceptors used for the traditional electrophotographic process based on the analog concept have low $\gamma$ characteristics. Accordingly, owing to these characteristics, the photosensitizer is unsuitable for an electrophotograph necessary for depicting inputted digital light signals, such as printers for data output of a computer, digital copies obtained by digital processing images, as digital images. That is, this is because the photoreceptors using the photosensitizers faithfully depict even the deterioration of the digital signals in a signal route from a computer or an image processor to the electrophotographic devices and also the aberration by an optical system for focussing a light beam for writing or for imaging original images and thus the original digital images cannot be reproduced.

Also, as the light source to be used in such a digital recording system, there are gas lasers such as an argon laser, a helium-neon laser, etc., a semiconductor laser, a light emitting diode, etc. From among these lasers, the semiconductor laser is being widely used at present due to its suitable size and reasonable cost, and it is desirable that a photoreceptor also has a high sensitivity to the light emission wavelengths (at about near infrared) of the semiconductor laser.

That is, it is required that the photoreceptor to be used for the digital recording system have characteristics (hereinafter, are referred to as high $\gamma$ characteristics) that the photocurrent linearly analogous to the input light quantity is not passed therethrough and the photocurrent is passed in a small amount until a certain quantity of light is reached but when the quantity of light exceeds a definite value, the photocurrent passes rapidly until the potential reaches the base potential (residual potential).

Accordingly, to provide of a material for photoreceptor having a high sensitivity and the high $\gamma$ characteristics, which can be utilized in the field, has been strongly desired.

Under these circumstances, a concept of a photoreceptor for digital light input is disclosed in JP-A-1-169454 (the term "JP-A" as used herein means an "Japanese Patent Laid-Open Publication"). However, there is no practical description of the materials which can be used for the photoreceptors for digital light input.

Also, even titanyl phthalocyanine described in JP-A-3-37662 and the phthalocyanine mixed crystal described in JP-A-2-84661 are still insufficient for use as the photosensitizers for the photoreceptors for digital light input described above since these $\gamma$ characteristics are not so high and these residual potentials are high.

SUMMARY OF THE INVENTION

The present invention has been made under the foregoing circumstances and the object of the present invention is to provide a phthalocyanine mixed crystal which is suitable for use as a highly-sensitive photoreceptor for a digital light input, a production method thereof, and an electrophotographic photoreceptor using the phthalocyanine mixed crystal.

That is, as a result of earnestly conducting various investigations for attaining the foregoing object, the inventor has discovered that when a phthalocyanine mixed crystal showing a specific X-ray diffraction spectrum obtained by using two kinds of specific phthalocyanine compounds is used for an electrophotographic photoreceptor, the photoreceptor can be used not only for a digital recording system but also for an analog recording system and further as a method of obtaining the phthalocyanine mixed crystal, a method of later dissolving the phthalocyanine compounds as the raw materials in an acid, depositing the mixed crystal by a specific means is excellent and has achieved the present invention.

The first aspect of the present invention is in a phthalocyanine mixed crystal comprising hydrogen phthalocyanine and titanyl phthalocyanine, wherein the phthalocyanine mixed crystal has peaks at Bragg angles ($2\theta \pm 0.2°$) of 6.8°, 7.4°, 15.0°, 24.7°, 26.2°, and 27.2° in the X-ray diffraction spectrum and the ratio of the peak intensity at 27.2° to the peak intensity at 6.8° is 1 or more.

The second aspect of the present invention is a production method for a phthalocyanine mixed crystal, which comprises dissolving at least two kinds of phthalocyanine compounds in an acid and adding the solution to a mixed liquid of water and one or more organic solvent(s) having a relative permittivity of 20 or less to deposit as a phthalocyanine mixed crystal.

The third aspect of the present invention is an electrophotographic photoreceptor comprising an electrically conductive substrate having formed thereon a photosensitive layer containing a phthalocyanine mixed crystal, wherein the phthalocyanine mixed crystal comprises titanyl phthalocyanine and hydrogen phthalocyanine, has peaks at Bragg angles ($2\theta\pm0.2°$) of 6.8°, 7.4°, 15.0°, 24.7°, 26.2°, and 27.2° in the X-ray diffraction spectrum, and the ratio of the peak intensity at 27.2° to the peak intensity at 6.8° is 1 or more.

When a photosensitive layer is formed using the phthalocyanine mixed crystal of the present invention, the phthalocyanine mixed crystal shows a specific manner of passing the photo electric power to the light input. That is, according to the value (to certain threshold value) of a photocurrent, the photocurrent is digitally passed. Accordingly, the phthalocyanine mixed crystal is suitable for use as the digital light input photoreceptor to be used for the electrophotography of a digital recording system.

In addition, the photosensitive layer using the phthalocyanine mixed crystal obtained by the production method of the present invention can output a digital signal even when an input light is an analog light by A/D transferring the input light. Accordingly, even when the phthalocyanine mixed crystal of the present invention is used as a conventional photoreceptor for PPC (analog light input), high quality images with sharp edges can be obtained.

Also, in the case of preparing a function separated type photoreceptor, the electrophotographic photoreceptor of the present invention has a high sensitivity in the long-wavelength region of about 780 nm, whereby when the photoreceptor is used for, in particular, a laser printer, it gives excellent effects. Also, when the phthalocyanine mixed crystal of the present invention to be used as a charge generation material is a crystal with a good stability, an electrophotographic photoreceptor having excellent durability and storage stability can be obtained. Furthermore, the storage stability of the coating liquid for the photosensitive layer of an electrophotographic photoreceptor is also improved.

DETAILED DESCRIPTION OF THE INVENTION

Figure 1:
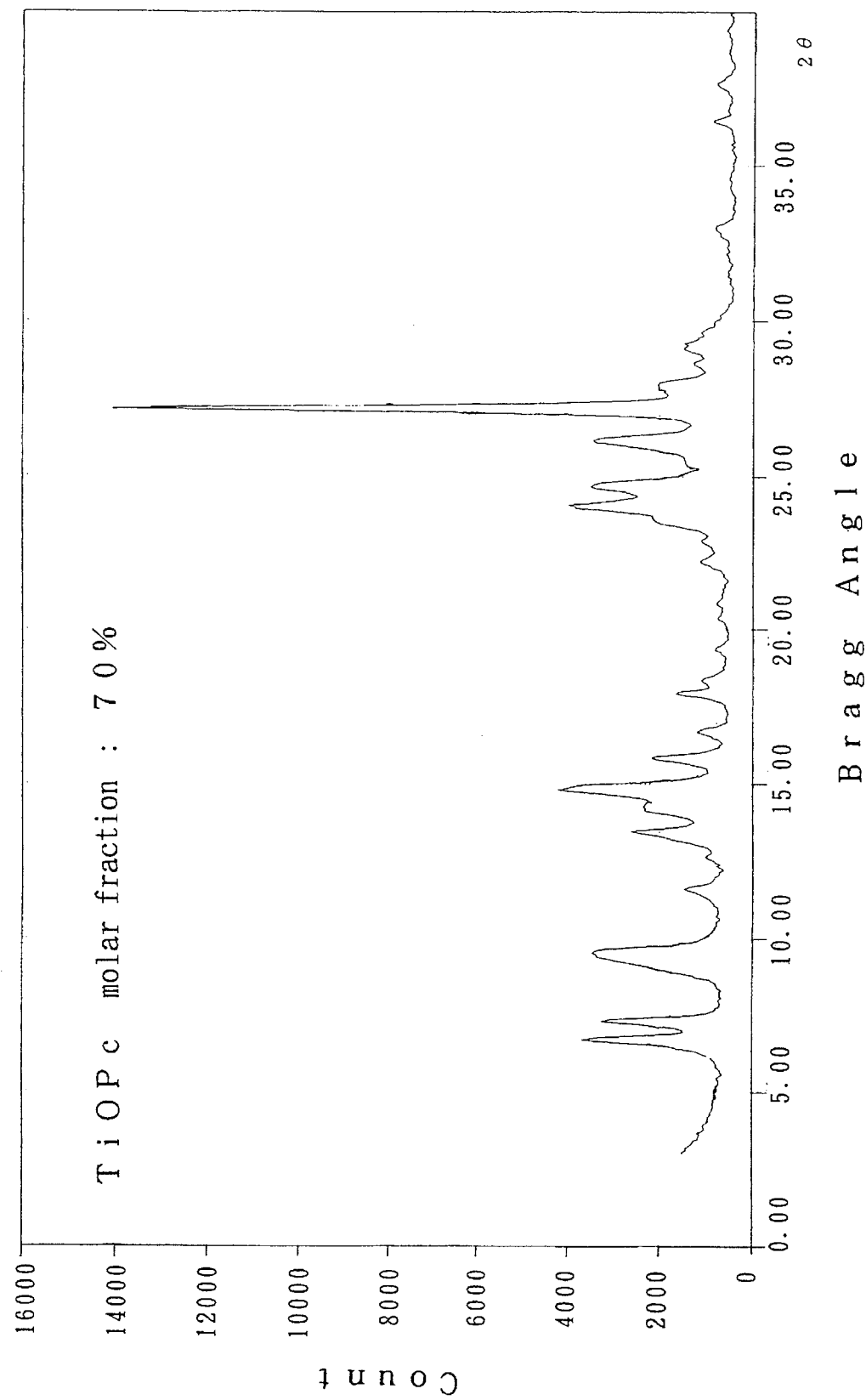
FIG. 1 is a graph showing the X-ray diffraction spectrum of the phthalocyanine mixed crystal obtained in Example 2.

The present invention is described in detail hereinbelow.

The phthalocyanine mixed crystal of this invention is composed of hydrogen phthalocyanine (metal-free phthalocyanine) and titanyl phthalocyanine as the main components.

The molar fractions of hydrogen phthalocyanine and titanyl phthalocyanine in the total phthalocyanine mixed crystal are preferably from 95 to 40% and from 5 to 60%, respectively, more preferably from 95 to 50% and from 5 to 50%, respectively, particularly preferably from 95 to 60% and from 5 to 40%, respectively, and furthermore preferably from 90 to 60% and from 10 to 40%, respectively.

In this case, if the molar fraction of titanyl phthalocyanine is more than 95%, the $\gamma$ characteristics are sometimes lowered and if the molar fraction of titanyl phthalocyanine is less than 40%, the charging characteristics are deteriorated making the phthalocyanine mixed crystal poor in practical for use sometimes.

The molar fraction of each phthalocyanine compound in the mixed crystal obtained by combining the foregoing phthalocyanine compounds can be determined using the X-ray diffraction spectrum of the mixed crystal obtained. That is, the mixed crystal of hydrogen phthalocyanine and titanyl phthalocyanine has peaks at Bragg angles ($2\theta\pm0.2°$) of 6.8°, 7.4°, 15.0°, 24.7°, 26.2°, and 27.2° and if the ratio of the peak intensity at 27.2° to the peak intensity at 6.8° is 1 or more, the molar fractions composition of hydrogen phthalocyanine and titanyl phthalocyanine in the mixed crystal are within the range described above. In the case, the measurement conditions of the powder X-ray diffraction spectrum are as follows.

Target: $K\alpha$ line of Cu

Divergent slit: 1°

Scattering slit: 1°

Photodetective slit: 0.2 mm

Step angle: 0.06°

Counting time: 1 second

Hydrogen phthalocyanine and titanyl phthalocyanine described above can be synthesized according to the known synthesis methods described in Moser and Thomas, "Phthalocyanine Compounds" but may be synthesized by any other methods.

For example, titanyl phthalocyanine can be obtained at a good yield by a method of heat-melting o-phthalonitrile and titanium tetrachloride or heating them in the presence of an organic solvent such as $\alpha$-chloronaphthalene, etc., or by a method of heating 1,3-diiminoisoindoline and tetrabutoxytitanium in the presence of an organic solvent such as N-methylpyrrolidone, etc. Hydrogen phthalocyanine can be synthesized through the method described above without using the metal compound. Also, the phthalocyanine compounds synthesized as described above may contain a chlorine-substituted phthalocyanine, etc., wherein the hydrogen atom(s) of the benzene ring at the outside are substituted with chlorine(s), etc.

As the production method of the phthalocyanine mixed crystal, there are preferably, for example, (1) a method of dissolving titanyl phthalocyanine and hydrogen phthalocyanine in an acid and depositing the mixed crystal in a mixed liquid of water and one or more organic solvent(s), (2) a method of depositing the mixed crystal from the foregoing acid solution in an alcohol, (3) a method of dissolving titanyl phthalocyanine and hydrogen phthalocyanine in an acid as described above, depositing the mixed crystal as wet paste in water, and treating the wet paste with organic solvent(s), and (4) a method of synthesizing hydrogen phthalocyanine (or titanyl phthalocyanine) in the presence of titanyl phthalocyanine (or hydrogen phthalocyanine) and treating the synthesized product with an organic solvent in the presence of water.

As the acid to be used in methods (1), (2), and (3) described above, there are inorganic acids such as sulfuric acid, phosphoric acid, etc., and organic acids such as methanesulfonic acid, ethanesulfonic acid, fluoroacetic acid, chloroacetic acid, etc., and in these acids, sulfuric acid, methanesulfonic acid, and fluoroacetic acid are preferably used and sulfuric acid and methanesulfonic acid are more preferably used.

There is no particular restriction on the amount of the acid to be used if the amount can dissolve titanyl phthalocyanine and hydrogen phthalocyanine as raw materials but the amount of the acid is preferably from 10 to 1,000 g, and more preferably from 50 g to 500 g to 1 g of the total amounts of the phthalocyanine compounds as the raw materials. Also, the temperature of the reaction system at dissolution is preferably from −20° C. to 80° C., and more preferably from −10° C. to 30° C. If the dissolution temperature is over 80° C., the phthalocyanine compounds used as the raw materials sometimes decompose and if the dissolution temperature is lower than −20° C., the solubility of the phthalocyanine compounds is sometimes deteriorated.

As the alcohol to be used in the method (2), there are aliphatic alcohols having from 1 to 8 carbon atoms, alicyclic alcohols having from 5 to 8 carbon atoms, and aromatic alcohols such as phenol, etc. In these alcohols, methanol, ethanol, propanol, butanol, pentanol, cyclopentanol, and cyclohexanol are preferred and methanol, ethanol, propanol, butanol, and cyclohexanol are more preferred.

The amount of the mixed liquid of water and the organic solvent(s), the alcohol, or water to be used for depositing the phthalocyanine mixed crystal from the acid solution of the phthalocyanine compounds in methods (1), (2), and (3) is preferably from 5 to 100 times, and more preferably from 5 to 20 times by volume of the amount of the acid solution of the phthalocyanine compounds. If the amount of the depositing solvent is less than 5 times the amount of the acid solution, the control of the generation of heat is difficult, while if the amount is more than 100 times the amount of the acid solution, the operability is sometimes reduced as the amount thereof is increased. Also, in this case, the deposition temperature is preferably from −20° C. to 80° C., and more preferably from −10° C. to 40° C.

As the organic solvent to be used in methods (1), (3), and (4), usually an organic solvent having a relative permittivity of 20 or less is employed. The relative permittivity of the organic solvent is preferably from 1 to 15, and particularly preferably from 2 to 12. If an organic solvent with a relative permittivity of over 20 is used, crystals which hinder the performance grow due to the excessively high polarity, whereby the desired mixed crystal cannot be obtained.

Organic solvent having a relative permittivity of 20 or less, include, for example, the following organic solvents (the number in the parenthesis behind each compound shows the relative permittivity of the compound at 20° C.).

There are aliphatic hydrocarbons having from 4 to 12 carbon atoms, and preferably from 5 to 8 carbon atoms (1.7 to 2.0); alicyclic hydrocarbons having from 4 to 12 carbon atoms, and preferably from 5 to 8 carbon atoms (2.0 to 2.5); aromatic hydrocarbons such as benzene (2.3), toluene (2.4), xylene (2.3 to 2.7), ethylbenzene (2.6), etc.; halogenated aliphatic hydrocarbons such as chloropentane (6.6), butyl chloride (7.4), propyl chloride (7.7), tetrachloroethane (2.3), dichloroethane (10.7), carbon tetrachloride (2.2), chloroform (4.8), methylene chloride (7.8), butyl bromide (7.1), propyl bromide (8.1), ethyl bromide (9.4), methyl bromide (9.8), etc.; halogenated aromatic hydrocarbons such as chlorobenzene (5.7), dichlorobenzene (2.4 to 9.9), bromobenzene (5.4), dibromobenzene (2.6 to 7.4), etc.; ketones such as methyl ethyl ketone (18.5), pentanone (15.4), hexanone (16.4), methyl cyclohexanone (14.0), cyclohexanone (18.3), dipropyl ketone (12.6), etc.; ethers such as dibutyl ether (3.1), dihexyl ether, ethylene glycol monomethyl ether (16.0), ethylene glycol dimethyl ether (5.5), tetrahydrofuran (7.4), dioxane (2.2), etc.; esters such as methyl acetate (6.7), ethyl acetate (6.0), propyl acetate (6.0), butyl acetate (5.0), methyl propionate (5.5), ethyl propionate (5.6), propyl propionate, butyl propionate (4.8), diethyl oxalate (1.8), diethyl malonate (7.9), etc.; and amines such as ethylamine (7.0), dipropylamine (3.1), butylamine (4.9), dibutylamine (3.0), pentylamine, ethylhexylamine, cyclohexylamine (4.7), dicyclohexylamine, aniline (7.1), toluidine (5.0 to 6.3), piperidine (5.8), pyridine (12.3), morpholine (7.4), etc.

In the present invention, the foregoing organic solvents, toluene, xylene, chlorobenzene, dichlorobenzene, chloroform, methylene chloride, dichloroethane, tetrahydrofuran, dipropyl ketone, ethylamine, ethyl acetate, etc., are preferably used and further toluene, chlorobenzene, dichlorobenzene, dichloroethane, tetrahydrofuran, ethylamine, etc., are more preferably used.

The organic solvent treatment in methods (3) and (4) described above can be carried out using general stirring devices and also can be also carried out using a homo-mixer, a paint mixer, a ball mill, a sand mill, an attritor, a disperser, an ultrasonic disperser, etc. Also, when the treatment time is in the range of from 1 minute to 120 hours, preferably from 5 minutes to 50 hours, and more preferably from 10 minutes to 24 hours, the γ characteristics of the phthalocyanine mixed crystal obtained can be more improved and the residual potential of the photoreceptor can be lowered.

The production of the phthalocyanine mixed crystal of this invention can be practiced by any one of the production methods (1) to (4) described above.

In particular, method (1) can be applied in the case of using other phthalocyanine compounds as the raw materials and when the phthalocyanine mixed crystal obtained is used for an electrophotographic photoreceptor, the photoreceptor has high γ characteristics and can be sufficiently used as a digital light input photoreceptor.

Below, method (1) is explained including the cases in which other phthalocyanine compounds are used.

Phthalocyanine compounds which can be used in addition to titanyl phthalocyanine and hydrogen phthalocyanine, include copper phthalocyanine, vanadyl phthalocyanine, zirconyl phthalocyanine, etc. For obtaining the phthalocyanine mixed crystal, two or more kinds of these phthalocyanine compounds can be used.

Furthermore, in terms of the combinations of the foregoing phthalocyanine compounds, a combination containing titanyl phthalocyanine is preferred and more preferred combinations include a combination of titanyl phthalocyanine and hydrogen phthalocyanine and a combination of titanyl phthalocyanine and vanadyl phthalocyanine.

In the combinations described above, the mixing ratio of the phthalocyanine compounds may be optional. For example, in the case of that 2 kinds of phthalocyanine compounds are used, they may be mixed in molar ratios of between 0.1:99.9 and 99.9:0.1, preferably between 2.5:97.5 and 97.5:2.5, more preferably between 5:95 and 95:5, and particularly preferably between 10:90 and 90:10. By limiting the mixing ratio of these phthalocyanine compounds as described above, the γ characteristics can be improved.

The compounding ratio of water in the mixed liquid of water and the organic solvent(s) to be used for depositing the phthalocyanine compounds dissolved in the acid is preferably from 5 to 95% by weight, and more preferably from 10 to 80% by weight to the total amount of the mixed solution.

In this case, as in the case of separating the mixed liquid of water and the organic solvent(s) in two layers when water and the organic solvent(s) are mixed with foregoing ratio, at the addition of a solution of the phthalocyanine compounds in an acid to the mixed liquid of water and the organic solvent(s) as described above, it is preferred to employ the treatment such as adding the acid solution of the phthalocyanine compounds to the mixed liquid of water and the organic solvent(s) uniformly mixed by stirring, etc., or stirring the whole reaction liquid after adding the acid solution of the phthalocyanine compounds to the mixed liquid of water and the organic solvent(s). Also, at any proper stage of the foregoing treatment, by adding a proper surface active agent to the reaction liquid, the dispersion system of water and the organic solvent can be easily prepared through the function of the surface active agent.

Also, even in the case of using the mixed liquid wherein water and the organic solvent(s) are uniformly dissolved in each other, it is usual to stir the mixture in order to shorten the treatment time. As the mixing method, a general stirring device is used as well as a homomixer, a paint mixer, a ball mill, a sand mill, an attritor, a disperser, a ultrasonic disperser means, etc., may be used.

In this case, the amount of the mixture of water and the organic solvent(s) to be used for the foregoing treatment is preferably from 2 to 100 times by volume, more preferably from 3 to 80 times by volume, and furthermore preferably from 5 to 50 times by volume of the volume of the acid solution of the phthalocyanine compounds. If the amount of the mixed liquid of water and the organic solvent(s) is less than twice the amount of the acid solution of the phthalocyanine compounds, the control of the reaction temperature is sometimes difficult, while the amount is more than 100 times the amount of the acid solution, the operation efficiency is sometimes lowered.

Furthermore, as the addition of the acid solution of the phthalocyanine compounds to the mixed liquid of water and the organic solvent(s), a dropping addition is preferred as the addition method. The temperature of the treatment liquid is preferably from −20° C. to 80° C., more preferably from 0° C. to 60° C., and furthermore preferably from 0° C. to 40° C. One of the reasons for carrying out the stirring in the above treatment is for controlling the temperature and in the case that no stirring is carried out, the temperature control becomes sometimes difficult. Also, the treatment time of the foregoing treatment is from i minute to 120 hours, preferably from 5 minutes to 50 hours, and more preferably from 10 minutes to 24 hours.

The phthalocyanine mixed crystal obtained by each of the methods (1) to (4) described above is recovered from the reaction liquid by filtration and dried to be isolated and to provide a raw material for the photosensitive layer of the electrophotographic photoreceptor of the present invention. Or, without isolating the phthalocyanine mixed crystal of the present invention from the reaction liquid, a solvent substitution, etc., is carried out and thus a coating liquid for the photosensitive layer can be prepared without the necessity for a drying step.

The electrophotographic photoreceptor of the present invention comprising an electrically conductive substrate having formed thereon a photosensitive layer containing the phthalocyanine mixed crystal, wherein the phthalocyanine mixed crystal is composed of titanyl phthalocyanine and hydrogen phthalocyanine, has peaks of Bragg angles (2θ±0.2°) of 6.8°, 7.4°, 15.0°, 24.7°, 26.2°, and 27.2° in the X-ray diffraction spectrum and the ratio of the peak intensity at 27.2° to the peak intensity at 6.8° is 1 or more, and preferably the molar fraction of titanyl phthalocyanine in the phthalocyanine mixed crystal is from 90 to 40%.

As the electrically conductive substrate to be used for the electrophotographic photoreceptor of this invention, there are metal plates, metal drums, electrically conductive compounds such as electrically conductive polymers, indium oxide, etc., and substrates such as papers, ceramics, plastics, films, etc., on which is formed an electrically conductive layer of a metal such as aluminum, palladium, gold, etc., by coating, vacuum evaporation, a laminate, etc. The form of the electrically conductive substrate may be that of a sheet, a drum, a belt, a seamless belt, etc.

The photosensitive layer is formed on the electrically conductive substrate. In this case, an intermediate layer composed of an organic high molecular compound such as a polyamide, polyvinyl alcohol, cellulose, etc., or aluminum oxide, etc., can be formed between the electrically conductive substrate and the photosensitive layer for improving the charging characteristics and the adhesive property. Also, for the purpose of protecting the surface of the photosensitive layer, a protective layer composed of an acrylic resin, a polyester, a polyurethane, a silicone, a fluoroplastic, etc., can be formed on the surface of the photosensitive layer.

There is no particular restriction on the construction of the photosensitive layer in this invention, thus any form may be employed. The thickness of the photosensitive layer is preferably from 5 to 50 μm. For example, there are a photosensitive layer using the phthalocyanine mixed crystal as a substantially photoconductive material only and dispersing the mixed crystal in a binder resin, and a photosensitive layer or so-called function separated photosensitive layer using the phthalocyanine mixed crystal as a charge generation material and containing therein together with a charge transport material. In addition, the term "function separated" in this invention means that both the charge generation material and the charge transport material are used.

The electrophotographic photoreceptor using the former photosensitive layer using the phthalocyanine mixed crystal as the photoconductive material is suitable for the digital light input photoreceptors, and the latter electrophotographic photoreceptor using the function separated photosensitive layer is suitable for the conventional analog light input photoreceptors.

For producing the electrophotographic photoreceptor using the phthalocyanine mixed crystal as the photoconductive material, the foregoing phthalocyanine mixed crystal is uniformly dispersed together with a binder resin usually used for the production of the electrophotographic photoreceptors and, if necessary, a solvent, etc., by a kneading and dispersing device such as a ball mill, an attritor, etc., the dispersion is coated on an electrically conductive substrate using an air doctor coater, a plate coater, a rod coater, a reverse coater, a spray coater, a hot coater, a squeeze coater, a gravure coater, etc., whereafter, proper drying is carried out until a sufficient charge potential is applied to remove the solvent and to form a photosensitive layer (photoconductive layer), and thus an electrophotographic photoreceptor may be prepared.

The binder resin to be used for the production of the electrophotographic photoreceptor described above is for forming the photosensitive layer together with the phthalocyanine mixed crystal and examples thereof are binder resins having an insulative property having a volume specific resistance of $10^7$ Ω cm or more, such as a melamine resin, an epoxy resin, a silicone resin, a polyurethane resin, a polyester resin, an alkyd resin, an acrylic resin, a methacrylate resin, a fluororesin, a xylene resin, a vinyl chloride vinyl acetate copolymer, a polycarbonate resin, a cellulose derivative, etc., and binder resins having a semiconductor property, such as polyvinyl carbazole, etc.

The solvent is used mainly for controlling the viscosity in the case that the mixture of the phthalocyanine mixed crystal and the binder resin is coated on the electrically conductive substrate and examples thereof are toluene, cyclohexanone, xylene, etc.

The composition ratio of the binder resin and the phthalocyanine mixed crystal of this invention constituting the photosensitive layer described above can be generally between about 1:1 and 10:1 by weight ratio. Thus, for example, as compared with that in the case of the photosensitive layer using zinc oxide as the photosensitive material, the weight ratio of the binder resin and zinc oxide is about 1:5, the ratio of the binder resin in the photosensitive layer is large, the photosensitive layer has a high physical strength, and the electrophotographic photoreceptor enriched with flexibility can be obtained.

In addition, as the binder resin described above, a curable fluororesin can be used in this invention.

The curable fluororesin to be used in the present invention is a resin having fluorine atom(s) and functional group(s) reactive with a curing agent, which will be described later, and generally, a copolymer from an ethylenic unsaturated monomers having fluorine atom(s) and an ethylenic unsaturated monomer having no fluorine atom.

As the ethylenic unsaturated monomer having fluorine atom(s), there are fluorine-containing olefins such as tetrafluoroethylene, trifluoroethylene, vinylidene fluoride, vinyl fluoride, monochlorotrifluoroethylene, 1-chloro-2,2-difluoroethylene, 1,1-dichloro-2,2-difluoroethylene, vinylidene chlorofluoride, hexafluoropropene, 3,3,3,2-tetrafluoropropene, trifluoromethylethylene, 2-fluoropropene, 2-chloro-1,1,3,3,3-pentafluoropropene, 1,1,2-trichloro-3,3, 3-trifluoropropene, perfluoro-1-butene perfluoro-1-pentene, perfluorobutylethylene, perfluoro-1-heptene, perfluoro-1-nonene, perfluorohexylethylene, perfluorooctylethylene, perfluorodecylethylene, perfluorododecylethylene, etc.; fluoroalkyl (meth)acrylates such as trifluoroethyl (meth)acrylate, tetafluoropropyl (meth)acrylate, hexafluorobutyl (meth)acrylate, octafluoropentyl (meth)acrylate, heptadecafluorononyl (meth)acrylate, heptadecafluorodecyl (meth)acrylate, etc.; a alkyl fluoride vinyl ether (a part or all of hydrogen atoms of an alkyl vinyl ether are replaced by fluorine atom(s)); a vinyl ester of a fluoroaliphatic acid(a part or all of hydrogen atoms of a vinyl ester of an aliphatic acid are replaced by fluorine atom(s)), etc. One or more kinds of such ethylenic unsaturated monomers having fluorine atom(s) can be used as the raw material for the curable fluororesin.

Also, as the ethylenic unsaturated monomers having no fluorine atom, which form the curable fluororesin (copolymer) by copolymerizing with the ethylenic unsaturated monomers having fluorine atom(s) described above, there are ethylenic unsaturated monomers having functional group(s) reactive with the curing agent, such as, for example, a hydroxyl group, a carboxyl group, an amino group, a glycidyl group, etc. Examples of the ethylenic unsaturated monomers having no fluorine atom are a hydroxyalkylvinyl ether, a hydroxyalkyl allyl ether, allyl alcohol, hydroxyalkyl (meth)acrylate, acrylic acid, methacrylic acid, glycidylallyl ether, and glycidylvinyl ether. Furthermore, as other ethylenic unsaturated monomer having no fluorine atom, there are ethylenic unsaturated monomers capable of introducing functional group(s) reactive with the curing agent into the copolymer and capable of being introduced into the copolymer for the purpose of controlling the physical properties thereof, such as vinyl ethers, allyl ethers, vinyl esters, allyl esters, olefins, etc., each having no foregoing functional group. One or more kinds of such ethylenic unsaturated monomers having no fluorine atom can be selected in accordance with various kinds of purposes, and use as the raw material for the curable fluororesin. Also, as the raw material for the curable fluororesin, the ethylenic unsaturated monomers having no fluorine atom which are capable of being introduced into the copolymer for the purpose of controlling the physical properties thereof, can be used.

To obtain the curable fluororesin to be used in this invention, various kinds of the ethylenic unsaturated monomers having fluorine atom(s) and ethylenic unsaturated monomers having no fluorine atom described above as used as the raw materials, but in these monomers, as the ethylenic unsaturated monomer having fluorine atom(s), fluoroolefins is preferred and as the ethylenic unsaturated monomer having no fluorine atom, vinyl ethers and vinyl esters are preferred. Furthermore, as the ethylenic unsaturated monomer having no fluorine atom, vinyl ethers and vinyl esters having a hydroxyl group are more preferred.

In the curable fluororesin to be used in the present invention, the ratio of the component of ethylenic unsaturated monomers having fluorine atom(s) is preferably from 25 to 75 mole %, and more preferably from 40 to 60 mole % to the total amount of the copolymer.

Such a curable fluororesin to be used in the present invention can be easily obtained by copolymerizing the foregoing monomers as the raw materials by an ordinary polymerization method but there are commercially available products such as "Cefral Coat" (trade name, produced by Central glass Co., Ltd.), "Lumiflon" (trade name, produced by Asahi glass Co., Ltd.), etc., and these commercially available curable fluororesins can be also used in this invention.

The photosensitive layer is obtained by dissolving the foregoing fluororesin thus obtained in a solvent and crosslinking-curing by the reaction with the curing agent in the state of dispersing the phthalocyanine mixed crystal described above or the photosensitive layer is obtained by using the fluororesin only without adding the curing agent.

The mixing ratio of the phthalocyanine mixed crystal and the curable fluororesin is preferably between 5:95 and 50:50, and particularly preferably between 10:90 and 40:60.

The solvent in the case that the curable fluororesin is used is preferably selected from the solvents which dissolve the curable fluororesin and in which crystals of the phthalocyanine mixed crystal which would hinder the performance do not grow. Solvents having such properties, include, for example, hydrocarbons such as toluene, xylene, mineral spirits, etc.; ketones such as acetone, methyl ethyl ketone, methyl butyl ketone, methyl isobutyl ketone, cyclohexanone, etc.; halogenated hydrocarbons such as dichloromethane, dichloroethane, trichloroethane, trichloroethylene, chlorobenzene, etc; ethers such as tetrahydrofuran, dioxane, monogrime, digrime, anisole, etc.; alcohols such as methanol, ethanol, propanol, butanol, methyl cellosolve, ethyl cellosolve, butyl cellosolve, cyclohexanol, etc.; esters such as ethyl acetate, propyl acetate, butyl acetate, cellosolve acetate, butyl cellosolve acetate, etc.; and amides such as dimethylformamide, N-methylpyrrolidone, etc.

These solvents can be used singly or as a mixture thereof.

Also, the curing agent to be used for the photosensitive layer coating liquid together with the curable fluororesin and the phthalocyanine mixed crystal is compounded for crosslinking and curing the curable fluororesin and as such a curing agent, included, for example, compounds each having at least 2 active groups, such as a melamine resin, a benzoguanamine resin, a glycoluril resin, polyisocyanate, and glyoxal. The compounding amount of the curing agent in the coating liquid differs according to the curing condition, and the amount and the kind of the functional groups of the curing agent but in general, the curing agent is used in an amount such that the amount of the functional groups of the curing agent becomes equivalent to or larger than the amount of the functional groups of the curable fluororesin.

The foregoing curing agent, the phthalocyanine mixed crystal, and the curable fluororesin are uniformly dispersed or dissolved together with additives to be used if necessary, such as a catalyst, an antioxidant, etc., thus the photosensitive layer coating liquid obtained is coated on the electrically conductive substrate followed by drying and curing to form a photosensitive layer.

The drying and curing described above are preferably carried out by a method involving heating after pre-drying at room temperature. Drying and curing by heating can be carried out at temperatures ranging from 30° to 300° C. and from 1 minute to 6 hours in state of rest or air-blowing. The treatment can be also carried out in an inert gas or in vacuo. The thickness of the photosensitive layer thus obtained is in the range of preferably from 5 to 50 µm, and more preferably from 10 to 30 µm.

The electrophotographic photoreceptor having dispersed therein the phthalocyanine mixed crystal obtained as described above is usually used as a positive charging photoreceptor. Since the photoreceptor shows a specific passage of a photocurrent as compared with conventional electrophotographic photoreceptors, the photoreceptor can be used as a photoreceptor for a digital light input.

That is, in a conventional photoreceptor, a photocurrent of the amount linearly corresponding to (the logarithmic value of) the input light quantity passes as described above, while in the photoreceptor of the present invention, a photocurrent does not pass or the amount thereof is very small if it does pass until a certain quantity of input light is reached and directly after the photocurrent is over the foregoing certain quantity of input light, the photocurrent passes suddenly. This coincides with the photosensitive characteristics required for the electrophotographic photoreceptor of the digital recording system such as expressing an image gradation sequence with dot areas.

This is because even when a laser spot is correctly modulated by an optical system, the optical system is inevitably accompanied by an aberration if a highly correction of the aberration is not applied. Accordingly, it cannot be avoided in principle that a distribution of a light quantity occurs in the spot itself of the optical system and a halo occurs.

Thus, in a conventional electrophotographic photoreceptor picking up stepwise the change of a light energy (input light quantity), the density of the dot patterns is changed by the change in the light quantity and also even by slight blotting of a spot, the outer edges of the dot patterns are changed. The changes in the dot patterns described above cause noise and fog. On the other hand, since the electrophotographic photoreceptor using the phthalocyanine mixed crystal of the present invention can cancel such changes in the dot patterns, the photoreceptor is an effective digital light input photoreceptor.

Also, the electrophotographic photoreceptor using the curable fluororesin described above has features excellent for practical use in that the adhesion of the photosensitive layer and the electrically conductive substrate is large, the humidity resistance is good, the change over time is less, the toxic problem is less, the production is easy, and the photoreceptor is obtained at a low cost.

A function separated photoreceptor wherein the phthalocyanine mixed crystal is contained in the photosensitive layer together with a charge transport material may be a negative charging photoreceptor prepared by forming on an electrically conductive substrate the photosensitive layer composed of the laminated layers of a charge generation layer containing the phthalocyanine mixed crystal, which is a charge generation material, as the main component and a charge transport layer containing a charge transport material as the main component, or may be a positive charging photoreceptor prepared by forming on an electrically conductive substrate the photosensitive layer having dispersed the charge generation material in the charge transport material.

In the case that the laminated layers of the charge generation layer and the charge transport layer are used as the photosensitive layer, the thickness of the charge generation layer is preferably from 0.001 to 10 µm, and more preferably from 0.2 to 5 µm. If the thickness of the charge generation layer is thinner than 0.001 µm, it becomes difficult to form the uniform layer, while the thickness is over 10 µm, the electrophotographic characteristics tend to be lowered. Also, the thickness of the charge transport layer is preferably from 5 to 50 µm, and more preferably from 8 to 20 µm. If the thickness of the charge transport layer is thinner than 5 µm, the initial potential is lowered, while when the thickness is over 50 µm, the sensitivity tends to be lowered.

The charge generation material to be used for the photosensitive layer includes the foregoing phthalocyanine mixed crystal and as other charge generation material, organic pigments generation electrostatic charges such as other phthalocyanine compounds, azo pigments, etc.

Also, as the charge transport material to be used for the photosensitive layer of the electrophotographic photoreceptor of the present invention, included are, for example, negative charge transporting electron accepting materials such as trinitrofluorenone, tetranitrofluorenone, etc., and positive charge transporting electron donating materials such as polymers having a heterocyclic compound in the side chain (e.g., poly-N-vinylcarbazole), triazole derivatives, oxadiazole derivatives, imidazole derivatives, pyrazoline derivatives, polyarylalkane derivatives, phenylenediamine derivatives, hydrazone derivatives, amino substituted chalcone derivatives, triarylamino derivatives, carbazole derivatives, stilbene derivatives, etc., but the charge transport materials to be used in this invention are not limited to these.

In the case that the photosensitive layer of the electrophotographic photoreceptor of the present invention is formed by mixing the charge generation material and the charge transport material, the mixing ratio of the charge generation material including the foregoing phthalocyanine mixed crystal and the charge transport material is preferably between 1:10 and 1:2 by weight ratio.

In this case, as in the case of using the polymer having a heterocyclic compound in the side chain, such as poly-N-vinylcarbazole, etc., as the charge transport material, a binder resin may or may not be used but in the case that other materials are used, a binder resin is necessary. The compounding amount of the binder resin is preferably from 30% by weight to 500% by weight to the total amounts of the charge transport material and the charge generation material. In the case that a binder resin is used, if necessary, a plasticizer, a fluidity imparting agent, a pinhole inhibitor agent, an antioxidant, etc., can be further added. In the case these additives are used, the compounding amounts of these are preferably not more than 5% by weight to the total amounts of the charge generation material, the charge transport material, and the binder resin.

When the laminate type photosensitive layer composed of the charge generation layer and the charge transport layer is used as the photosensitive layer of the electrophotographic photoreceptor of the present invention, the charge generation layer contains the foregoing phthalocyanine mixed crystal as the charge generation material but as described above, the charge generation layer can contain organic pigments, etc., generating electrostatic charges. Also, the charge generation layer may be formed by the vapor deposition of the phthalocyanine mixed crystal and may contain a binder resin in addition to the foregoing charge generation material. In this case, the compounding amount of the binder resin is preferably not more than 500% by weight to the amount of the charge generation material. Also, the foregoing additives (a plasticizer, a fluidity imparting agent, a pinhole inhibitor, an antioxidant etc.) may be added in an amount of not more than 5% by weight to the total amounts of the charge generation material and the bonder resin.

The charge transport layer contains the charge transport material as described above. The charge transport material can contain the binder resin in an amount of not more than 500% by weight to the amount of the charge transport material. Also, when the charge transport material is a low molecular compound, it is preferred that the binder resin is contained in an amount of 50% or more by weight to the amount of the charge transport material. Furthermore, if necessary, the charge transport layer may contain the foregoing additives in an amount of not more than 5% by weight to the total amounts of the charge transport material and the binder resin.

The binder resin to be used, the method of forming the photosensitive layer, and the solvent for the photosensitive layer coating liquid are the same as those used for the photoreceptor suitable for a digital light input described above.

The function separated electrophotographic photoreceptor obtained as described above is particularly suitable as conventional photoreceptor for an analog light input.

DESCRIPTION OF THE PREFERRED EMBODIMENTS

The invention is described below with reference to the following examples.

First, production examples of the phthalocyanine compounds to be used in the present invention are given.

Production Example 1: Production of Titanyl Phthalocyanine

After reacting 58 g of 1,3-diiminoisoindoline and 51 g of tetrabutoxytitanium in 300 ml of α-chloronaphthalene for 5 hours at 210° C., the reaction mixture was successively washed with α-chloronaphthalene and dimethylformamide (DMF). Thereafter, the product was washed with hot DMF, hot water, and methanol followed by drying to provide 51 g of titanyl phthalocyanine.

Production Example 2: Production of Hydrogen Phthalocyanine

After reacting 58 g of 1,3-diiminoindoline in 300 ml of α-chloronaphthalene for 5 hours at 210° C., the reaction mixture was successively washed with α-chloronaphthalene and DMF. Thereafter, the product was washed with hot DMF, hot water, methanol followed by drying to provide 42 g of hydrogen phthalocyanine.

Production Example 3: Production of Copper Phthalocyanine

After reacting 54 g of phthalic anhydride, 93 g of urea, 15.3 g of cupric chloride, and 0.6 g of ammonium molybdate in 450 ml of nitrobenzene for 5 hours at 190° C., the reaction mixture was successively washed with nitrobenzene and methanol. Thereafter, the product was boiled in 1000 ml of an aqueous solution of 1N hydrochloric acid for one hour and filtered while still hot. After washing the filtrate with a sufficient amount of water until the filtrate became neutral, the product was further boiled in 1000 ml of an aqueous solution of 1N sodium hydroxide for one hour. Then, the product was immediately filtered while still hot and the filtrate was washed with a sufficient amount of water until the filtrate became neutral followed by drying to provide 42 g of copper phthalocyanine.

Production Example 4: Production of Vanadyl Phthalocyanine

After reacting 58 g of 1,3-diiminoindoline and 28 g of vanadium pentaoxide in 300 ml of α-chloronaphthalene for 5 hours at 210° C., the reaction mixture was successively washed with α-chloronaphthalene and DMF. Thereafter, the product was washed with hot DMF, hot water, and methanol followed by drying to provide 42 g of vanadyl phthalocyanine.

Examples 1 to 9

Each of the mixtures of the phthalocyanine compounds at the ratios shown in Table 1 below was added to an acid cooled to 0° C., followed by stirring for one hour at 0° C. to completely dissolve the compounds. The acid solution of the phthalocyanine compounds was added to the mixture of water and the organic solvent of each composition shown in Table 1. After stirring the mixture for two hours at room temperature, the phthalocyanine mixed crystal deposited was collected from the mixed liquid by filtration and successively washed with methanol and water. After confirming that the washed water had become neutral, the phthalocyanine mixed crystal was collected from the washed water by filtration and dried.

TABLE 1

| Example | Phthalocyanine compound (g) Production Example 3 Cu | Production Example 2 $H_2$ | Production Example 1 TiO | Production Example 4 VO | Molar Ratio | Acid (g) | Water (ml) | Organic solvent (ml) | |
|---|---|---|---|---|---|---|---|---|---|
| 1 | 2.0 | 1.8 | | | 5:5 | Sulfuric acid 85 | 300 | Toluene | 300 |
| 2 | | 1.3 | 3.5 | | 3:7 | Sulfuric acid 400 | 1000 | Chlorobenzene | 500 |
| 3 | | 0.9 | 4.0 | | 2:8 | Sulfuric acid 400 | 800 | Toluene | 800 |
| 4 | | 0.9 | 4.0 | | 2:8 | Methane- sulfonic acid 400 | 800 | Toluene | 800 |
| 5 | | 2.0 | 3.4 | | 4:6 | Sulfuric acid 90 | 600 | Dichloroethane | 600 |
| 6 | | 2.7 | 2.0 | | 6:4 | Sulfuric acid 85 | 600 | Chlorobenzene | 600 |
| 7 | | | 4.0 | 1.0 | 8:2 | Sulfuric acid 150 | 500 | Tetrahydrofuran | 500 |
| 8 | 2.0 | | | 3.0 | 4:6 | Sulfuric acid 120 | 500 | Dichloroethane | 500 |
| 9 | | 1.0 | 3.0 | 1.0 | 2:6:2 | Sulfuric acid 120 | 500 | Xylene | 300 |

Comparative Examples 1 to 7

Using each of the raw materials (phthalocyanine compounds) shown in Table 2 and each of the treating liquids (sulfuric acid mixed liquids of water and the organic solvents) shown in Table 2, the same procedure as that of the examples was carried out and crystals each composed of single phthalocyanine compound were obtained in Comparative Examples 1 to 3, a phthalocyanine mixed crystal deposited with water only was obtained in Comparative Example 4, a phthalocyanine mixed crystal deposited with the organic solvent only was obtained in Comparative Example 5, and a mixture of phthalocyanine compounds obtained without dissolution with sulfuric acid was obtained in Comparative Example 6. Also, in Comparative Example 7, a mixed crystal of hydrogen phthalocyanine and titanyl phthalocyanine having an improper molar ratio was obtained.

Apparatus: JDX-3500, trade name, manufactured by JEOL LTD.

Tube Voltage: 40 kV

Tube Electric current: 200 mA

Target: Cu-Kα Ray

Divergent Slit: 1°

Scattering Slit: 1°

Photodetective Slit: 0.2 mm

Step angle: 0.06°

Counting Time: 1 second

For each X-ray diffraction spectrum obtained, peaks of the Bragg angle (2θ±0.2°) and the ratio of the peak intensity at 27.2° to the peak intensity at 6.8° were obtained. The results was shown in Table 3.

TABLE 2

| Comparative Example | Phthalocyanine (g) compound Cu | $H_2$ | Tio | VO | Molar Ratio | Acid (g) | Water (ml) | Organic solvent (ml) |
|---|---|---|---|---|---|---|---|---|
| 1 | 2.0 | | | | — | Sulfuric acid 40 | 100 | Toluene 100 |
| 2 | | 4.0 | | | — | Sulfuric acid 400 | 800 | Toluene 800 |
| 3 | | | 4.0 | | — | Sulfuric acid 400 | 800 | Toluene 800 |
| 4 | | 0.9 | 4.0 | | 2:8 | Sulfuric acid 100 | 600 | — |
| 5 | | 0.9 | 4.0 | | 2:8 | Sulfuric acid 100 | — | Chlorobenzene 600 |
| 6 | | 0.9 | 4.0 | | 2:8 | — | 600 | Chlorobenzene 600 |
| 7 | | 4.0 | 1.0 | | 8:2 | Sulfuric acid 400 | 800 | Toluene 800 |

X-Ray Diffraction Spectrum

In the examples and comparative examples described above, regarding the crystals of hydrogen phthalocyanine and titanyl phthalocyanine as the raw materials in Examples 2, 3, and 4 and Comparative Examples 2, 3, and 7, the powder X-ray diffraction spectra (FIG. 1 to FIG. 6) were obtained under the conditions shown below.

TABLE 3

Figure 2:
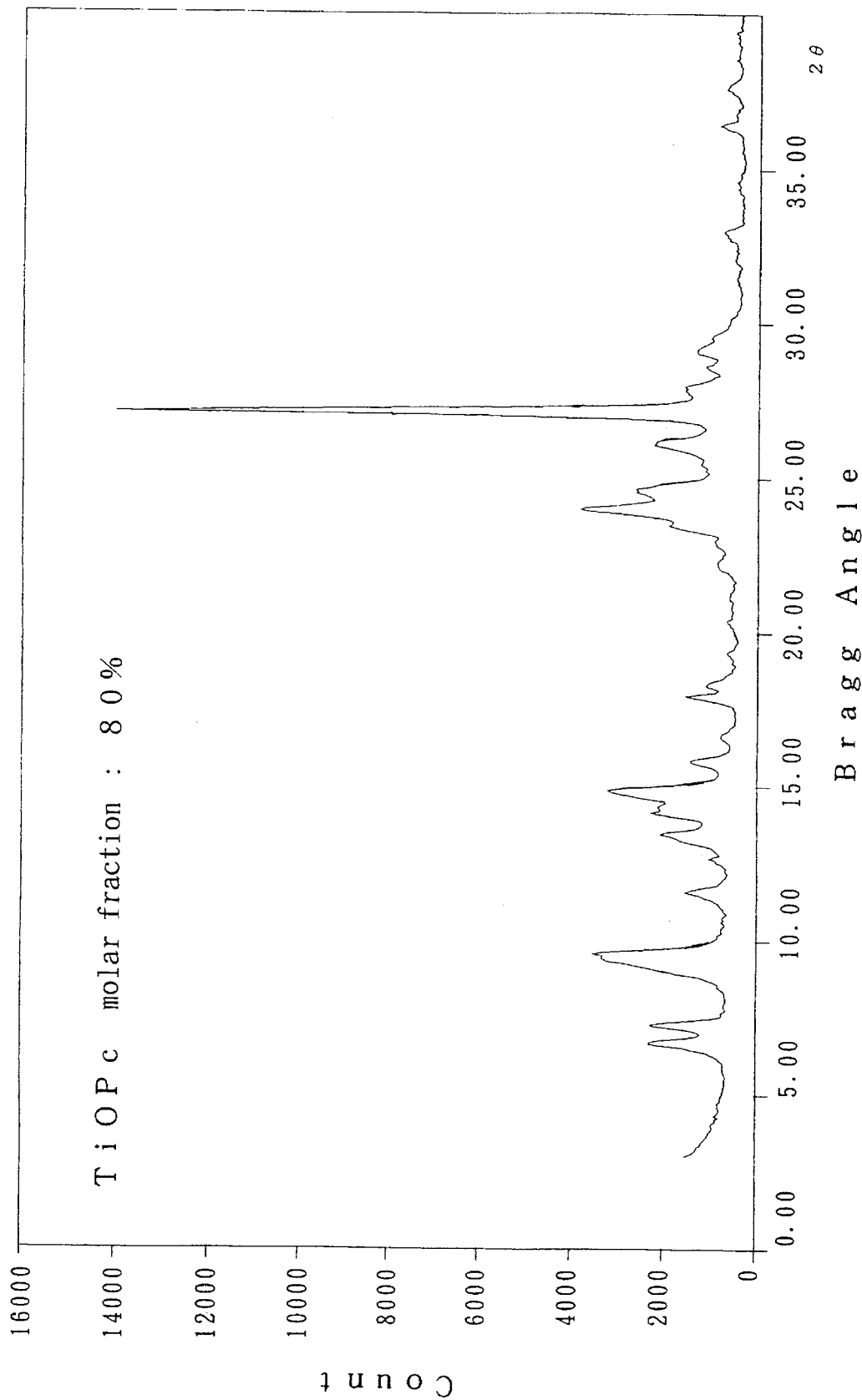
FIG. 2 is a graph showing the X-ray diffraction spectrum of the phthalocyanine mixed crystal obtained in Example 3.
Figure 3:
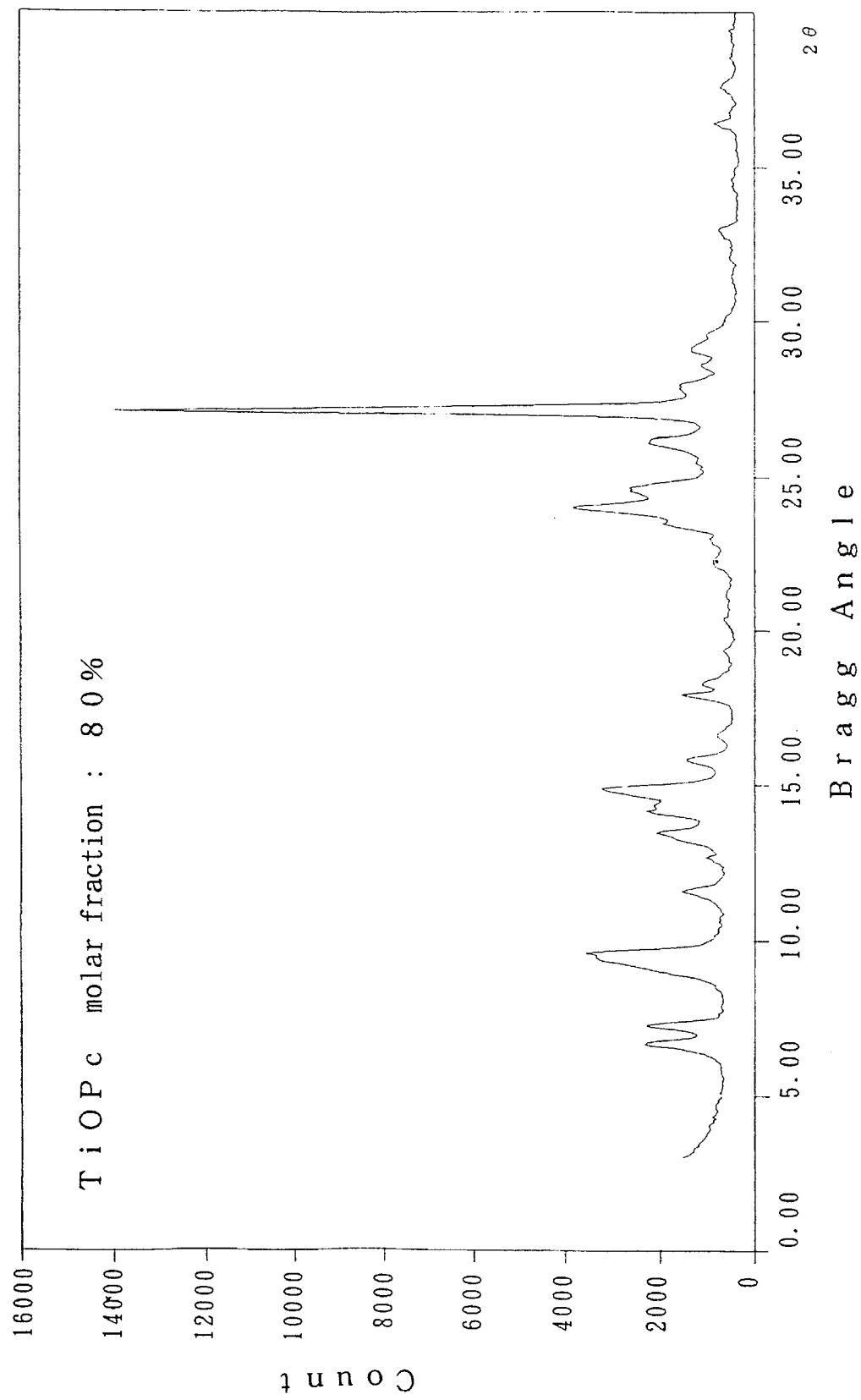
FIG. 3 is a graph showing the X-ray diffraction spectrum of the phthalocyanine mixed crystal obtained in Example 4.
Figure 4:
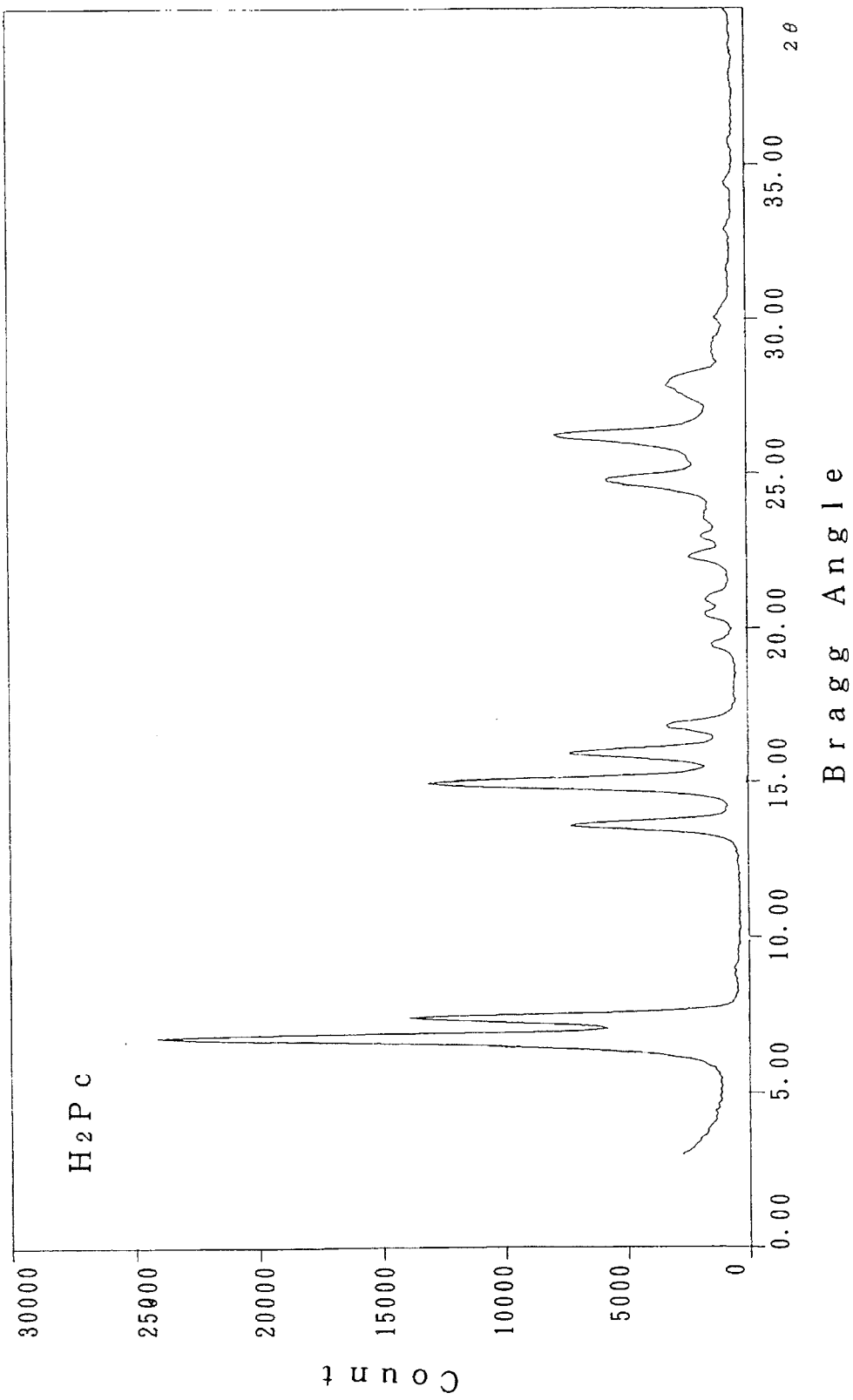
FIG. 4 is a graph showing the X-ray diffraction spectrum of the hydrogen phthalocyanine crystal obtained in Comparative Example 2.
Figure 5:
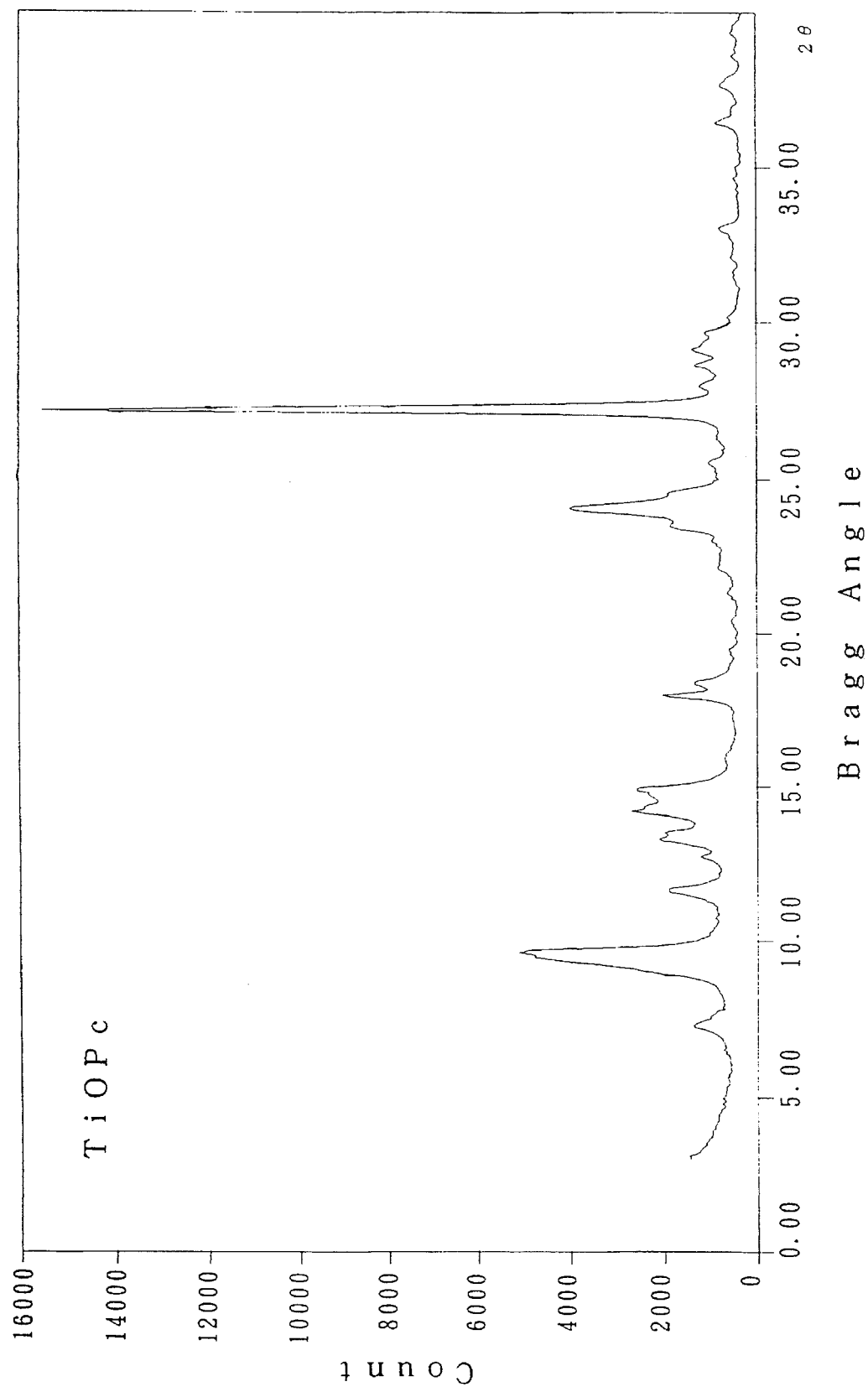
FIG. 5 is a graph showing the X-ray diffraction spectrum of the titanyl phthalocyanine crystal obtained in Comparative Example 3.
Figure 6:
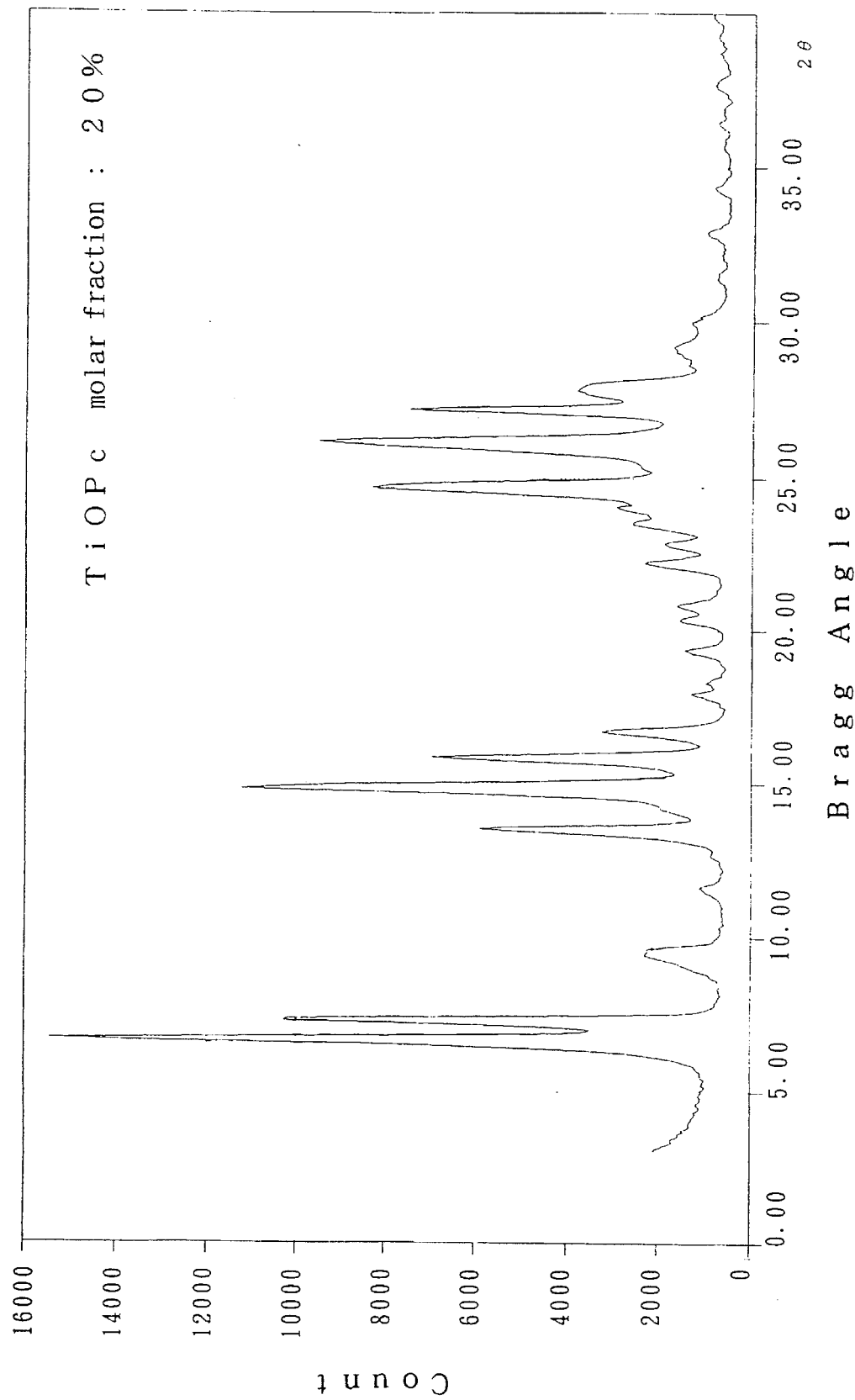
FIG. 6 is a graph showing the X-ray diffraction spectrum of the phthalocyanine mixed crystal obtained in Comparative Example 7.

|  | X-ray diffraction spectrum | Bragg angle (2θ± 0.2°) peaks | Peak intensity ratio (27.2°/ 6.8°) |
|---|---|---|---|
| Example | | | |
| 2 | FIG. 1 | 6.8°, 7.4°, 15.0°, 24.7°, 26.2°, 27.2° | 3.5 |
| 3 | FIG. 2 | 6.8°, 7.4°, 15.0°, 24.7°, 26.2°, 27.2° | 5.2 |
| 4 | FIG. 3 | 6.8°, 7.4°, 15.0°, 24.7°, 26.2°, 27.2° | 5.2 |
| Comparative Example | | | |
| 2 | FIG. 4 | 6.8°, 7.4°, 15.0° 24.7°, 26.2° | — |
| 3 | FIG. 5 | 7.4°, 15.0°, 24.7°, 26.2°, 27.2° | — |
| 7 | FIG. 6 | 6.8°, 7.4°, 15.0°, 24.7°, 26.2°, 27.2 | 0.5 |

As is clear from the results, the phthalocyanine mixed crystals obtained in Examples 2, 3, and 4 have the peaks at 6.8°, 7.4°, 15.0°, 24.7°, 26.2°, and 27.2° in the Bragg angle (2θ±0.2°) and the ratios of the peak intensity at 27.2° to the peak intensity at 6.8° are 1 or more but in Comparative Example 2, the product is the single crystal of hydrogen phthalocyanine and in the Bragg angle (2θ±0.2°), there is no peak of 27.2° and in Comparative Example 3, the product is the single crystal of titanyl phthalocyanine and there is no peak of 6.8° in the Bragg angle (2θ±0.2°). Also, in Comparative Example 7, the molar fraction of hydrogen phthalocyanine and titanyl phthalocyanine is not proper and the ratio of the peak intensity at 27.2° to the peak intensity at 6.8° is less than 1.

Then, using the phthalocyanine compositions obtained in Examples 1 to 9 and Comparative Examples 1 to 7, the following photoreceptors were prepared and the photosensitivity characteristics were evaluated.

To a composition consisting of 2.8 g of a polyester resin solution (Almatex P645, trade name, produced by Mitsui Toatsu Chemicals, Inc.), 1 g of a melamine resin (Uban 20HS, trade name, produced by Mitsui Toatsu Chemicals, Inc.), and 14 g of cyclohexane were added 0.8 g of the phthalocyanine mixed crystal obtained in Example 1 together with 30 g of glass beads and the mixture was dispersed for 6 hours using a paint mixer to provide a photoreceptor coating liquid. Then, the photoreceptor coating liquid was coated on an aluminum foil of 90 μm thick at a dry thickness of 15 μm and allowed to stand for one hour at 120° C. to prepare a photoreceptor.

By following the same procedure as above, using each of the phthalocyanine compositions obtained in other examples and the comparative examples, each of the photoreceptors was prepared.

The photosensitivity characteristics of each photoreceptor obtained above were evaluated using a photoreceptor evaluation apparatus (Cynthia-55, trade name, manufactured by Gentec Co.).

First, the photoreceptor was corona-charged at a voltage of +6.0 kV, the time (seconds) of the bending point that the surface potential of the photoreceptor was suddenly lowered was measured, and the time was defined as the dark attenuation time.

Then, each photoreceptor thus corona-charged was irradiated with each of the monochromatic lights of 780 nm each having a different light intensity, each light attenuation time curve (the characteristic curve of the surface potential to the irradiated time) to each light intensity was measured, and the surface potential after the irradiation for a definite time (0.075 second in this case) obtained from the curve was plotted corresponding to each light energy. This is called γ curve.

The maximum light energy in the light energies, capable of maintaining the surface potential at almost the same value as the initial charge, was defined as $E_1$ (the light energy at the descend point in the γ curve) and the minimum light energy in the light energies capable of lowering the surface potential up to about the residual potential (about 30 V) was defined as $E_2$ (the light energy at the rising point in the γ curve). Now, the value of $E_1$ shows the photosensitivity performance and as the value becomes smaller, the photosensitivity increases.

Also, the value of $E_2/E_1$ was used as the digital recordable aim by the following evaluation standard.

$0<E_2/E_1 \leq 5$: Digital recordable $5<E_2/E_1$: Analog recording

In addition, in the photoreceptors having $0<E_2/E_1 \leq 5$, the photoreceptor having smaller $E_1$ is said to have a high photosensitivity and to be excellent as an electrophotographic photoreceptor.

The measurement results are shown in Table 4.

TABLE 4

|  | Dark Attenuation Time (second) | $E_1$ (μJ/cm$^2$) | $E_2$ (μJ/cm$^2$) | $E_2/E_1$ | Residual Potential (V) |
|---|---|---|---|---|---|
| Example | | | | | |
| 1 | 85 | 1.0 | 5.0 | 5.0 | 15 |
| 2 | 21 | 0.2 | 0.5 | 2.5 | 20 |
| 3 | 35 | 0.2 | 0.5 | 2.5 | 20 |
| 4 | 45 | 0.2 | 0.6 | 3.0 | 20 |
| 5 | 15 | 0.2 | 0.5 | 2.5 | 20 |
| 6 | 15 | 0.2 | 0.4 | 2.0 | 25 |
| 7 | 30 | 0.3 | 0.7 | 2.3 | 30 |
| 8 | 55 | 1.0 | 4.0 | 4.0 | 20 |
| 9 | 20 | 0.5 | 1.8 | 3.6 | 20 |
| Comparative example | | | | | |
| 1 | 30 | 5.0 | 68.5 | 13.7 | 200 |
| 2 | 12 | 2.0 | 30.0 | 15.0 | 120 |
| 3 | 20 | 0.2 | 36.5 | 182.5 | 150 |
| 4 | 20 | 2.5 | 9.5 | 3.8 | 25 |
| 5 | 120 | 0.2 | 120.0 | 600 | 350 |
| 6 | 200 | — | — | — | 550 |
| 7 | Not charged | — | — | — | 0 |

As is clear from the results, in the photoreceptors each using each of the phthalocyanine mixed crystals obtained in the examples, the values of $E_2/E_1$ are all lower than 5 and each photoreceptor can be used as the photoreceptor for digital light input. Also, it can be seen that in the photoreceptors using the crystals each composed of the single phthalocyanine compound obtained in each of Comparative Examples 1 to 3, the phthalocyanine mixed crystal deposited with the organic solvent only in Comparative Example 5, the mixture of the phthalocyanine compounds obtained without performing the dissolution with sulfuric acid in Comparative Example 6, and mixed crystal having an improper molar fraction in Comparative Example 7, the values of $E_2/E_1$ are all over 5 and they are not suitable for use as photoreceptors for a digital light input. It can be seen that in the photoreceptor using the phthalocyanine mixed crystal deposited with water only in Comparative Example 4 the value of $E_2/E_1$ is lower than 5 but, the value of $E_1$ is large therefore this photoreceptor is poor at photosensitivity characteristics.

Production Example 5: Production of Titanyl Phthalocyanine Crystal

After adding 10 g of the titanyl phthalocyanine obtained in Production Example 1 to 210 g of sulfuric acid cooled to 0° C., the mixture was stirred for one hour at 0° C. After confirming that titanyl phthalocyanine was completely dissolved, the solution was poured into 1200 ml of water cooled to 0° C. and washed with water. After confirming that the washed water became neutral, the wet paste deposited was added to 1000 ml of dichloroethane. The mixture was stirred for 2 hours at room temperature, washed with methanol, and after filtering, the product collected was dried at 60° C. to provide 9.3 g of a titanyl phthalocyanine crystal.

Figure 7:
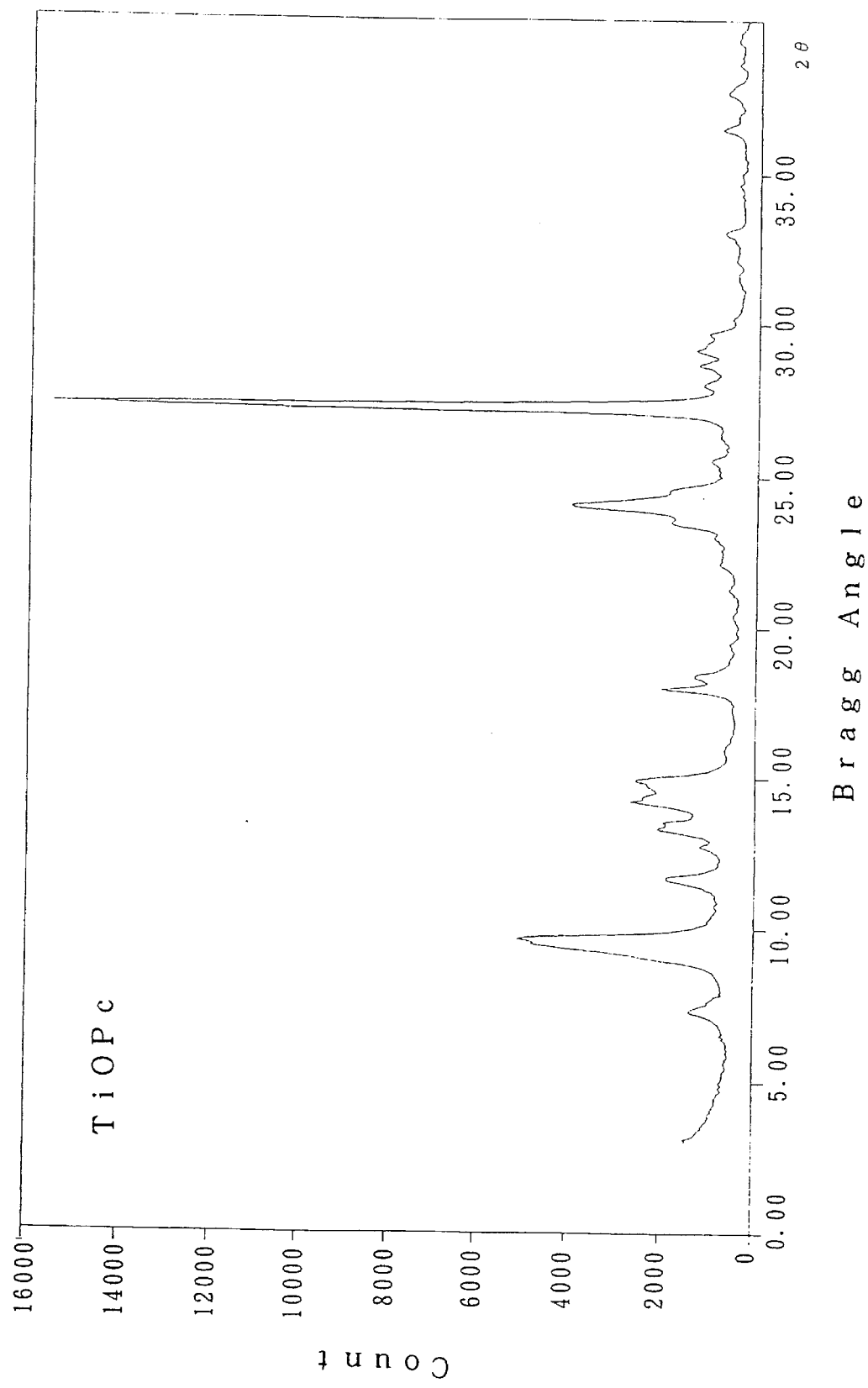
FIG. 7 is a graph showing the X-ray diffraction spectrum of the titanyl phthalocyanine crystal obtained in Production Example 5.

The X-ray diffraction spectrum of the titanyl phthalocyanine mixed crystal was shown in FIG. 7. The titanyl phthalocyanine crystal had peaks at 7.3°, 14.9°, and 27.2° in the Bragg angle ($2\theta \pm 0.2°$) but did not have peaks at 6.8°, 24.7°, and 26.2° and thus was different from the phthalocyanine mixed crystal of the present invention.

Examples 10 to 15 and Comparative Examples 8 to 11

Each of the components shown in Table 5 were placed in a glass container together with glass beads having a diameter of 2 mm, then the container was closed and the mixture was dispersed for 4 hours by a paint mixer to provide each photoreceptor coating liquid.

Each of the photoreceptor coating liquids obtained above was coated on a degreased aluminum sheet of 90 μm in thickness by a wire bar method, after pre-drying at room temperature, the aluminum sheet thus coated was dried in an oven for one hour at 100° C., and thereafter, the sheet was heat-cured for 10 minutes at 200° C. to provide one of the electrophotographic photoreceptor.

In Example 13, instead of above heat-curing, heating was carried out for one hour at 100° C. and in Example 15 and Comparative Examples 9 and 11, the conditions of drying and heat-curing followed pre-drying at room temperature, heat-curing in the oven for 3 hours at 200° C.

The layer thickness of each of the electrophotographic photoreceptors of the examples and the comparative examples thus obtained was measured. The results are given in the last column of Table 5 above.

The photosensitive characteristics and repeating characteristics of each electrophotographic photoreceptor were evaluated.

As to the photosensitive characteristics, $E_1$ and $E_2$ were obtained by the same method as in Example 1. Also, for the repeating characteristics, on each electrophotographic photoreceptor, (1) (+) charging (+6.0 kV), (2) light exposure (780 nm, 20 μJ/cm$^2$), (3) (−) charging (−5.3 kV), and (4) erase light (200 lux, tungsten lamp) were repeated, the surface potential $V_0$ directly after (+) charging was measured for each repetition and the number of repetitions N until $V_0$ deviated 10% or more was recorded.

The results of the evaluations are given in Table 6.

TABLE 5

| | | Compounded amount (g,*:mg) | | | | | | | | | |
|---|---|---|---|---|---|---|---|---|---|---|---|
| | | Example | | | | | | Comparative Example | | | |
| Component | | 10 | 11 | 12 | 13 | 14 | 15 | 8 | 9 | 10 | 11 |
| Sensitizer | Phthalocyanine mixed crystal obtained in Example 3 | 1.0 | 1.0 | 1.0 | 1.0 | 1.0 | 1.0 | — | — | — | — |
| | Tiatanyl phthalocyanine crystal obtained in Production Example 5 | — | — | — | — | — | — | 1.0 | 1.0 | — | — |
| | Phthalocyanine mixed crystal obtained in Comparative Example 7 | — | — | — | — | — | — | — | — | 1.0 | 1.0 |
| Resin | Fluoro resin (Cefral Coat A-202B produced by Central glass Co., Ltd.) | 6.4 | — | 6.7 | — | — | — | 6.4 | — | 6.4 | — |
| | Fluoro resin (Cefral Coat A-402B produced by Central glass Co., Ltd.) | — | 5.8 | — | 6.3 | — | — | — | — | — | — |
| | Fluoro resin (Lumiflon LF200, produced by Asahi glass Co., Ltd.) | — | — | — | — | 5.6 | — | — | — | — | — |
| | Polyester Resin (Almatex P645 produced by Mitsui Toatsu Chemicals, Inc.) | — | — | — | — | — | 5.0 | — | 5.0 | — | 5.0 |
| Curing Agent | Melamine Resin (Nikalac MW-30, produced by Sanwa Chemical K. K.) | 0.8 | 0.8 | — | — | — | — | 0.8 | — | 0.8 | — |
| | Isocyanate (Coronate Hx, produced by Nippon Polyurethane Industry Co., Ltd.) | — | — | 0.7 | — | 0.6 | — | — | — | — | — |
| | Melamine Resin (Uban 20HS, produced by Nippon Polyurethane Industry Co., Ltd.) | — | — | — | — | — | 1.4 | — | 1.4 | — | 1.4 |
| Catalyst | Dibutyltin Dilaurate | — | — | 0.1* | — | 0.1* | — | — | — | — | — |
| Solvent | Toluene | 20.0 | 20.0 | 20.0 | 20.0 | 20.0 | — | 20.0 | — | 20.0 | — |
| | Cyclohexanone | — | — | — | — | — | 20.0 | — | 20.0 | — | 20.0 |
| Film thickness [μm] | | 16.0 | 15.5 | 15.7 | 15.2 | 16.0 | 15.8 | 15.9 | 15.5 | 16.2 | 16.1 |

TABLE 6

| | Sensitizer | | | Photoreceptor characteristics | | | Repeating characteristics | |
|---|---|---|---|---|---|---|---|---|
| | Composition of phthalocyanine mixed crystal | PcTiO Molar fraction | Resin | $E_1$ [μJ/cm$^2$] | $E_2$ [μJ/cm$^2$] | $E_2/E_1$ | Frat time $V_o$ [V] | N times [times] |
| Example 10 | PcTiO + PcH$_2$ | 80% | Fluoro resin | 0.20 | 0.80 | 4.0 | 512 | >10,000 |
| Example 11 | PcTiO + PcH$_2$ | 80% | Fluoro resin | 0.16 | 0.74 | 4.6 | 509 | >10,000 |
| Example 12 | PcTiO + PcH$_2$ | 80% | Fluoro resin | 0.18 | 0.50 | 2.8 | 498 | >10,000 |
| Example 13 | PcTiO + PcH$_2$ | 80% | Fluoro resin | 0.15 | 0.67 | 4.5 | 502 | >10,000 |
| Example 14 | PcTiO + PcH$_2$ | 80% | Fluoro resin | 0.20 | 0.61 | 3.1 | 510 | >10,000 |
| Example 15 | PcTiO + PcH$_2$ | 80% | Polyester resin | 0.17 | 27.0 | 158.8 | 499 | 3410 |
| Comparative Example 8 | PcTiO | 100% | Fluoro resin | 0.32 | 15.0 | 46.9 | 501 | 5550 |
| Comparative Example 9 | PcTiO | 100% | Polyester resin | 0.23 | 40.5 | 176.1 | 500 | 1240 |
| Comparative Example 10 | PcTiO + PcH$_2$ | 20% | Fluoro resin | x | x | x | 55 | x |
| Comparative Example 11 | PcTiO + PcH$_2$ | 20% | Polyester resin | x | x | x | 50 | x |

In addition, in the above table, x shows that a practically usable changed voltage was not obtained.

As is clear from the results, $E_2/E_1$ of each of the electrophotographic photoreceptors in Comparative Examples 8 to 11 is much larger than 5 and these photoreceptors are suitable for analog recording only, while the value of $E_2/E_1$ in each of the electrophotographic photoreceptors obtained in Examples 10 to 14 of the present invention is in the digital recordable range described above and the photoreceptors can be used as the photoreceptors for a digital light input. Also, as to the repeating characteristics, the electrophotographic photoreceptors in Examples 10 to 15 performed excellently at least several times as compared with the electrophotographic photoreceptors in the comparative examples which do not.

Also, it can be seen that the photoreceptors having the curable fluororesin as the binder resin are excellent for use as photoreceptors for a digital light input.

Production Example 6: Production of Titanyl Phthalocyanine Crystal

By following the same procedure as Example 3, except that 4 g of titanyl phthalocyanine were obtained in Production Example 1 as the raw material, 3.1 g of a titanyl phthalocyanine crystal were obtained. The X-ray diffraction spectrum of the titanyl phthalocyanine crystals had peaks at 7.3°, 14.9°, and 27.2° in the Bragg angle (2θ±0.2°) but did not have peaks at 6.8°, 24.7°, and 26.2° as same as shown in FIG. 7 and thus was different from the phthalocyanine mixed crystal of the present invention.

Production Example 7

Figure 8:
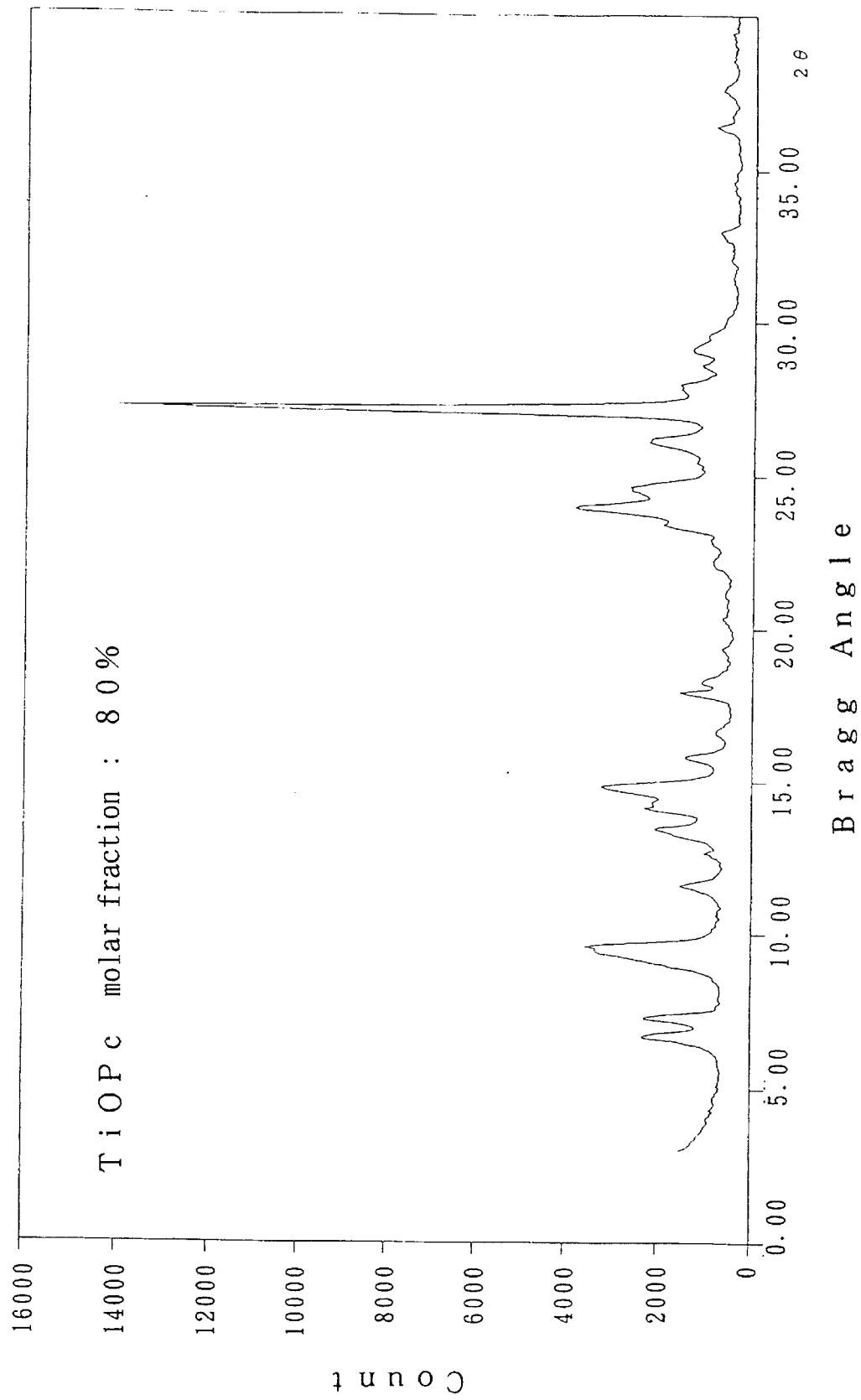
FIG. 8 is a graph showing the X-ray diffraction spectrum of the phthalocyanine mixed crystal obtained in Production Example 7.

To 400 g of sulfuric acid were added 4 g of titanyl phthalocyanine obtained above and 0.9 g of hydrogen phthalocyanine such that the molar fraction of the titanyl phthalocyanine became 80% and they were completely dissolved at 0° C. Then, the acid solution was dropped to 1500 ml of ethanol of 25° C. and after dropping, the mixture was stirred for one hour. Thereafter, the mixture was filtered, the filtrate was washed with water until the filtrate became neutral and dried to provide 4.2 g of a phthalocyanine mixed crystal. The X-ray diffraction spectrum of the mixed crystal was shown in FIG. 8. It can be seen that the phthalocyanine mixed crystal obtained is the phthalocyanine mixed crystal of the present invention having peaks at 6.8°, 7.4°, 15.0°, 24.7°, 26.2°, and 27.2° in the Bragg angle (2θ±0.2°) and having a ratio of the peak intensity at 27.2° to the peak intensity at 6.8° of 5.2.

Production Example 8

Figure 9:
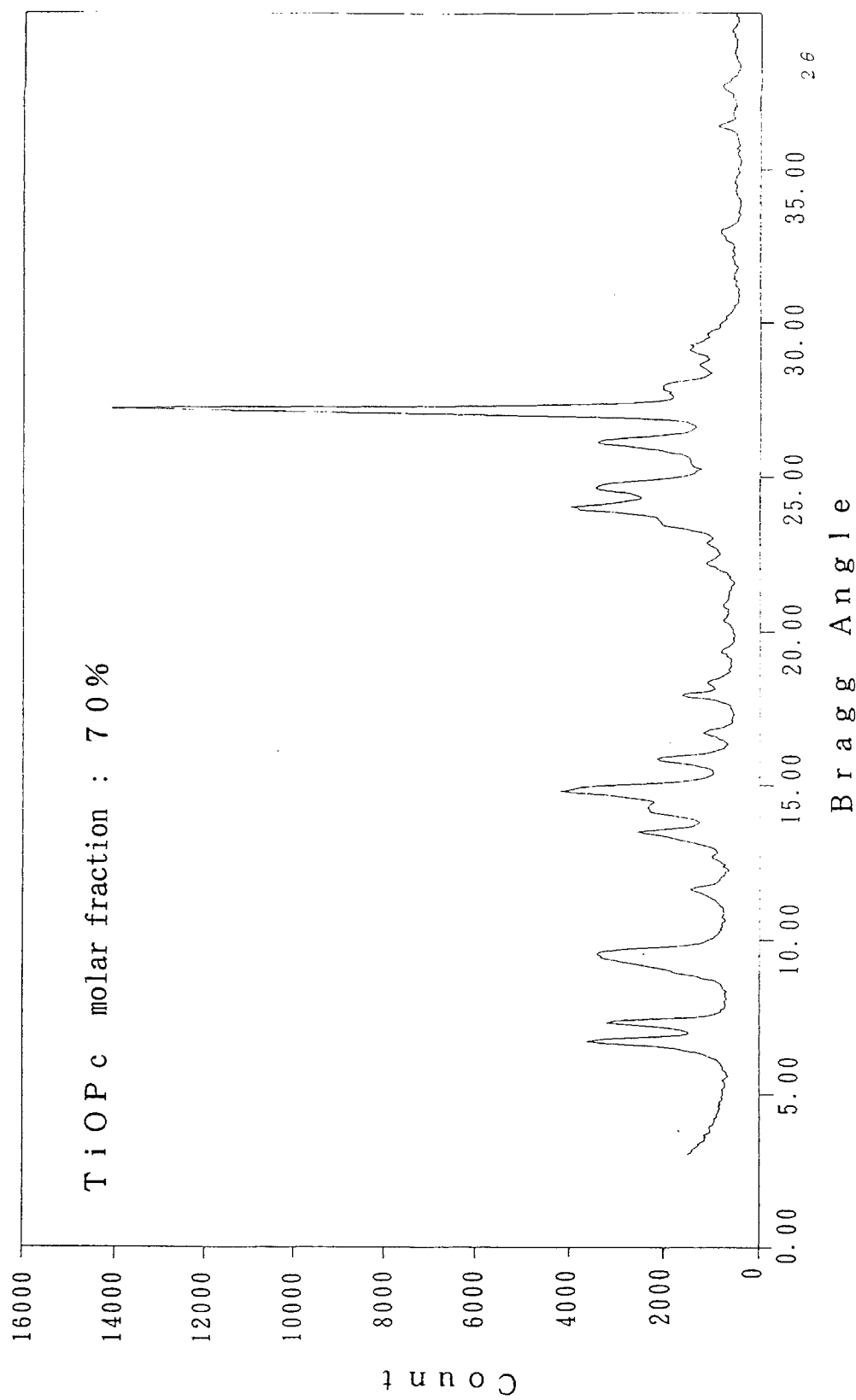
FIG. 9 is a graph showing the X-ray diffraction spectrum of the phthalocyanine mixed crystal obtained in Production Example 8.

To 400 g of sulfuric acid were added 3.5 g of the titanyl phthalocyanine obtained above and 1.3 g of hydrogen phthalocyanine such that the molar fraction of the titanyl phthalocyanine became 70% and they were completely dissolved at 0° C. Then, the acid solution was dropped to ice-water composed of 800 ml of water and 2400 g of ice, after stirring the mixture for one hour at room temperature, the mixture was filtered, and the filtrate was washed with a sufficient amount of water until the filtrate became neutral. The wet paste thus formed was added to 300 ml of dichloroethane and the mixture was stirred for 2 hours at room temperature. Thereafter, the reaction mixture was filtered and the filtrate was washed with water until the filtrate became neutral to provide 4.0 g of a phthalocyanine mixed crystal. The X-ray diffraction spectrum of the mixed crystal was shown in FIG. 9. It can be seen that the phthalocyanine mixed crystal obtained is the phthalocyanine mixed crystal of the present inventino having peaks at 6.8°, 7.4°, 15.0°, 24.7°, 26.2° and 27.2° in the Bragg angle (2θ±0.2°) and having a ratio of the peak intensity at 27.2° to the peak intensity at 6.8° of 3.5.

Examples 16 to 21 and Comparative Examples 12 to 14

Using each of the phthalocyanine mixed crystals obtained in Example 3 and Production Examples 7 and 8 as the charge generation material, two aluminum plates (electrically conductive substrates) each having a charge generation layer were prepared by the following method per each phthalocyanine mixed crystal of each example and production example.

was measured, and the sensitivity [$E_{1/2}(\mu J/cm^2)$] was obtained from the product with the incident light intensity. The results are given in the far right column of Table 7.

TABLE 7

| | Charge generation material | | | Photoreceptor characteristics Initial | |
|---|---|---|---|---|---|
| | Phthalocyanine mixed crystal | PcTio Molar fraction | Charge transport material | surface potential [V] | $E_{1/2}$ [$\mu J/cm^2$] |
| Example 16 | Phthalocyanine mixed crystal of Example 3 | 80% | p-Diethylaminobenzaldehyde dipheylhydrazone | 805 | 0.52 |
| Example 17 | Phthalocyanine mixed crystal of Example 3 | 80% | 2,5-Bis(p-diethylaminophenyl)-1,3,4-oxadiazole | 790 | 0.65 |
| Example 18 | Phthalocyanine mixed crystal of Production Example 7 | 80% | p-Diethylaminobenzaldehyde dipenylhydrazone | 790 | 0.53 |
| Example 19 | Phthalocyanine mixed crystal of Production Example 7 | 80% | 2,5-Bis(p-diethylaminophenyl)-1,3,4-oxadiazole | 800 | 0.58 |
| Example 20 | Phthalocyanine mixed crystal of Production Example 8 | 70% | p-Diethylaminobenzaldehyde dipheylhydrazone | 820 | 0.60 |
| Example 21 | Phthalocyanine mixed crystal of Production Example 8 | 70% | 2,5-Bis(p-diethylaminophenyl)-1,3,4-oxadiazole | 810 | 0.65 |
| Comparative Example 12 | Titanyl phthalocyanine crystal of Production Example 6 | 100% | p-Diethylaminobenzaldehyde dipenylhydrazone | 795 | 1.80 |
| Comparative Example 13 | Hydrogen phthalocyanine crystal of Comparative Example 2 | 0% | p-Diethylaminobenzaldehyde dipheylhydrazone | 790 | 3.50 |
| Comparative Example 14 | Phthalocyanine mixed crystal of Comparative Example 7 | 20% | p-Diethylaminobenzaldehyde dipenylhydrazone | 810 | 2.80 |

To 2.5 ml of tetrahydrofuran were added 50 mg of each phthalocyanine mixed crystal and 50 mg of polycarbonate (IUPILON E-2000, trade name, produced by Mitubishi Gas Chemical Company, Ltd.) and they were dispersed by a ball mill for 12 hours. The dispersion was coated in an aluminum plate at a dry thickness of 1 μm and dried at 50° C. to form the charge generation layer.

Then, on the charge generation layer formed on the aluminum plate was coated a charge transport layer by the following method using p-diethylaminobenzaldehyde diphenylhydrazone or 2,5-bis(p-diethylaminophenyl)-1,3,4-oxadiazole as the charge transport material to provide 6 kinds of electrophotographic photoreceptors having the constructions shown in Table 7 below.

That is, a solution formed by dissolving 200 mg of the charge transport material and 200 mg of polycarbonate (IUPILON E-2000, trade name, produced by Mitubishi Gas Chemical Company, Ltd.) in 2.5 ml of tetrahydrofuran was coated at a dry thickness of 15 μm and dried at 50° C. to form the charge transport layer.

Similarly, electrophotographic photoreceptors of comparative examples were prepared using the titanyl phthalocyanine crystal obtained in Production Example 6, the hydrogen phthalocyanine crystal obtained in Comparative Example 2, and the phthalocyanine mixed crystal obtained in Comparative Example 7, respectively.

The electrophotographic photoreceptors obtained were evaluated as follows.

First, each photoreceptor was corona-charged at a voltage of −6.0 kV, after placing the photoreceptor in the dark for one second and then measuring the initial surface potential, the photoreceptor was exposed to a monochromatic light of 780 nm obtained from a xenon lamp using a monochromator, the time of attenuating the initial surface potential to ½

From the results, it can be seen that the value of $E_{1/2}$ of the electrophotographic photorecepors in the comparative examples at 780 nm was large, namely 1.8 or more and the sensitivity thereof was low, while the value of $E_{1/2}$ of the electrophotographic photoreceptors of the present invention at 780 nm was less, namely 0.7 or less and the sensitivity thereof was very high.

What is claimed is:

1. An electrophotographic photoreceptor comprising an electrically conductive substrate having formed thereon a photosensitive layer containing a phthalocyanine mixed crystal, wherein the phthalocyanine mixed crystal is composed of titanyl phthalocyanine and hydrogen phthalocyanine, has peaks at 6.8°, 7.4°, 15.0°, 24.7°, 26.2°, and 27.2° of the Bragg angle (2θ±0.2°) in the X-ray diffraction spectrum and having a ratio of the peak intensity at 27.2° to the peak intensity at 6.8° of 1 or more.

2. An electrophotographic photoreceptor of claim 1, wherein the photosensitive layer comprises the phthalocyanine dispersed in a binder resin.

3. An electrophotogrphic photoreceptor of claim 2, wherein the binder resin is a curable fluororesin.

4. An electrophotographic photoreceptor of claim 2 or 3, wherein the photosensitive layer is a single layer.

5. An electrophotographic photoreceptor of claim 1 or 2, wherein the photosensitive layer further contains a charge transport material.

6. An electrophotographic photoreceptor of claim 1, wherein the photosensitive layer consists of laminated layers of a charge generation layer containing the phthalocyanine mixed crystal and a charge-transport layer containing a charge transport material.

7. An electrophotographic photoreceptor of claim 6, wherein the charge generation layer comprises the phthalocyanine mixed crystal dispersed in a binder resin.

\* \* \* \* \*